(12) United States Patent
Stein et al.

(10) Patent No.: US 8,613,188 B2
(45) Date of Patent: Dec. 24, 2013

(54) METHOD OF ENHANCING MICROTHRUSTER PERFORMANCE

(75) Inventors: William Benjamin Stein, West Lafayette, IN (US); Alina A. Alexeenko, West Lafayette, IN (US); Ivana Hrbud, Lafayette, IN (US); Darren L. Hitt, Jericho, VT (US)

(73) Assignees: Purdue Research Foundation, West Lafayette, IN (US); University of Vermont, Burlington, VA (US)

( * ) Notice: Subject to any disclaimer, the term of this patent is extended or adjusted under 35 U.S.C. 154(b) by 1148 days.

(21) Appl. No.: 12/466,357

(22) Filed: May 14, 2009

(65) Prior Publication Data

US 2010/0058734 A1    Mar. 11, 2010

Related U.S. Application Data

(60) Provisional application No. 61/127,553, filed on May 14, 2008.

(51) Int. Cl.
    *B63H 11/00*    (2006.01)
(52) U.S. Cl.
    USPC ............................................. 60/204; 60/203.1
(58) Field of Classification Search
    USPC .............. 60/200.1, 203.1, 204; 431/262, 258, 431/259
    See application file for complete search history.

(56) References Cited

U.S. PATENT DOCUMENTS

| | | | |
|---|---|---|---|
| 3,304,719 A * | 2/1967 | Ducati | 60/203.1 |
| 3,603,093 A * | 9/1971 | Isley et al. | 60/260 |
| 3,733,828 A | 5/1973 | Brown | |
| 5,901,551 A * | 5/1999 | Butler | 60/203.1 |
| 6,036,144 A | 3/2000 | Sisk | |
| 6,131,385 A | 10/2000 | Lewis et al. | |
| 6,213,431 B1 | 4/2001 | Janeke | |
| 6,263,665 B1 * | 7/2001 | Ketsdever et al. | 60/203.1 |
| 6,293,091 B1 | 9/2001 | Seymour et al. | |
| 6,487,844 B1 | 12/2002 | Lohn et al. | |
| 6,488,233 B1 | 12/2002 | Myrabo | |
| 6,499,287 B1 | 12/2002 | Taylor | |
| 6,516,605 B1 | 2/2003 | Meholic | |
| 6,539,703 B1 | 4/2003 | Lohn et al. | |
| 6,591,603 B2 * | 7/2003 | Dressler et al. | 60/258 |
| 6,629,416 B1 | 10/2003 | Johnson | |

(Continued)

FOREIGN PATENT DOCUMENTS

WO    2010068174 A1    6/2010

OTHER PUBLICATIONS

Zilic et al., "Numerical simulations of Supersonic Flow in a Linear Aerospike Micronozzle," 37th AIAA Fluid Dynamics Conference and Exhibit, Jun. 25-28, 2007, Miami FL.

(Continued)

*Primary Examiner* — Phutthiwat Wongwian
(74) *Attorney, Agent, or Firm* — Douglas G. Gallagher; Bingham Greenebaum Doll LLP

(57) ABSTRACT

Coaxial micronozzles are disclosed. Embodiments of the present disclosure include coaxial micronozzles with centerbody geometries to exploit pressure thrust. Some embodiemnts include a generally cylindrical centerbody extending through at least a portion of the flowpath and extending into the exit so as to form a generally annular throat, wherein the microthruster is adapted and configured such that the Reynolds number through the throat is less than about one thousand. Some embodiments show a potential threefold increase in specific impulse under vacuum and near vacuum conditions.

47 Claims, 13 Drawing Sheets

(56) References Cited

U.S. PATENT DOCUMENTS

| | | |
|---|---|---|
| 6,892,525 B2 | 5/2005 | Guiheen |
| 6,964,154 B1 | 11/2005 | Sackheim et al. |
| 6,974,111 B2 | 12/2005 | Janeke |
| 7,093,337 B1 | 8/2006 | Taylor |
| 7,467,684 B2 | 12/2008 | Wang et al. |
| 7,690,187 B2 | 4/2010 | Bekey |
| 7,858,048 B2 | 12/2010 | Gilligan et al. |
| 2005/0188677 A1 | 9/2005 | Nyberg et al. |
| 2007/0163227 A1 | 7/2007 | Mano |
| 2009/0113873 A1 | 5/2009 | Tweeton |
| 2009/0120056 A1* | 5/2009 | Friedberger et al. ......... 60/203.1 |
| 2011/0259230 A1* | 10/2011 | Sawka et al. .................. 102/374 |

OTHER PUBLICATIONS

Hitt et al., "MEMS-based satellite micropropulsion via catalyzed hydrogen peroxide decomposition," Smart Mater, Struct. 10 (2001), pp. 1163-1175.

Louisos et al., "Design considerations for supersonic micronozzles," (This document is a publisher's proof of an article that was scheduled to publish in Int. J. Manufacturing Research, vol. 3, No. 1, 2008, pp. 80-113.

* cited by examiner

METHOD OF ENHANCING MICROTHRUSTER PERFORMANCE

CROSS REFERENCE TO RELATED APPLICATION

This application claims the benefit of priority to U.S. Provisional Patent Application Ser. No. 61/127,553, filed May 14, 2008, entitled METHOD OF ENHANCING MICROTHRUSTER PERFORMANCE, incorporated herein by reference.

FIELD OF THE INVENTION

The present invention pertains to improved configurations of thrusting devices, and in particular to nozzle configurations for microthrusters.

BACKGROUND OF THE INVENTION

Microthrusters are becoming increasingly vital onboard modern spacecraft. While many spacecraft systems can be minimized with the application of new technology, hardware limitations and power requirements still constrain traditional propulsion system size. The proportion of the propulsion system increases as the size of a spacecraft is reduced. This limiting factor in spacecraft design results in the fact that many of today's micro- and nanosatellites have no onboard propulsion systems, even though these smaller spacecraft have similar mission requirements of their larger brethren.

There are six features often included in the design of spacecraft: modularity, maneuverability, maintainability, lifetime, autonomous operation, and launch/hardware cost. All of these aspects become more constrictive on the smaller spacecraft design. Both chemical and electric propulsion systems not only address these issues, but should still deliver a comparable propulsive performance to that of larger systems. In particular, electric propulsion systems should take into account power limitations as well. The integration of electric microthrusters relies on reducing both the power and voltage requirements while ensuring reliable, long-term performance.

Since the 1990s, electric propulsion (EP) has become a vital part of spacecraft propulsion for a wide spectrum of space missions and applications. These systems can provide significant performance benefits compared to conventional chemical systems. Commercial satellite manufacturers have embraced EP due to the significant economic advantages as well. To date, electrothermal, electrostatic and electromagnetic systems propel close to 200 spacecraft in various mission scenarios spanning from low earth orbit (LEO) to interplanetary trajectories. However, these systems employ electric thrusters which function best at power levels greater than 1 kW.

Electric propulsion in general provides a more propellant efficient, higher specific impulse method for in-space propulsion when compared with traditional chemical systems. While this attribute makes electric propulsion attractive for longer duration missions, this increase in specific thrust (Isp) adversely lowers the available thrust. This lower thrust level often limits the electric propulsion operation to that of space missions, where higher thrust levels are not required. This thrust limitation also makes electric propulsion attractive for station-keeping maneuvers, low-thrust attitude control, and low thrust inter-planetary missions.

Regardless of the method of adding energy to a fluid to provide thrust, there is always a need to achieve as much thrust as possible from the fluid. By increasing net thrust at a particular mass flowrate, the size and weight of the microthruster can be better optimized for the particular application. Various embodiments of the present invention provide novel and nonobvious ways in which to increase thrust.

SUMMARY OF THE INVENTION

One aspect of one embodiment of the present invention pertains to a thrusting device. Some embodiments include a pressure vessel having an entrance for receiving a supply of gas and defining an exit for releasing the gas to ambient conditions, the pressure vessel defining an internal flowpath between the entrance and exit. Yet other embodiments include a generally annular throat.

Another aspect of one embodiment of the present invention includes a microthruster for a spacecraft. Some embodiments include a pressure vessel having an entrance for receiving the supply of gas and defining an exit for releasing the gas to ambient conditions, the pressure vessel defining an internal flowpath between the entrance and exit. Yet other embodiments include a centerbody having a first section with a conical outer surface increasing in the direction of flow toward the exit, In yet other embodiments, the centerbody includes a second section having a conical outer surface decreasing in the direction of flow toward the exit, the second section and the exit forming an annulus therebetween. Still further embodiments pertain to a centerbody that includes an aft face that is blunt.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

Table of Symbols

Figure 1:
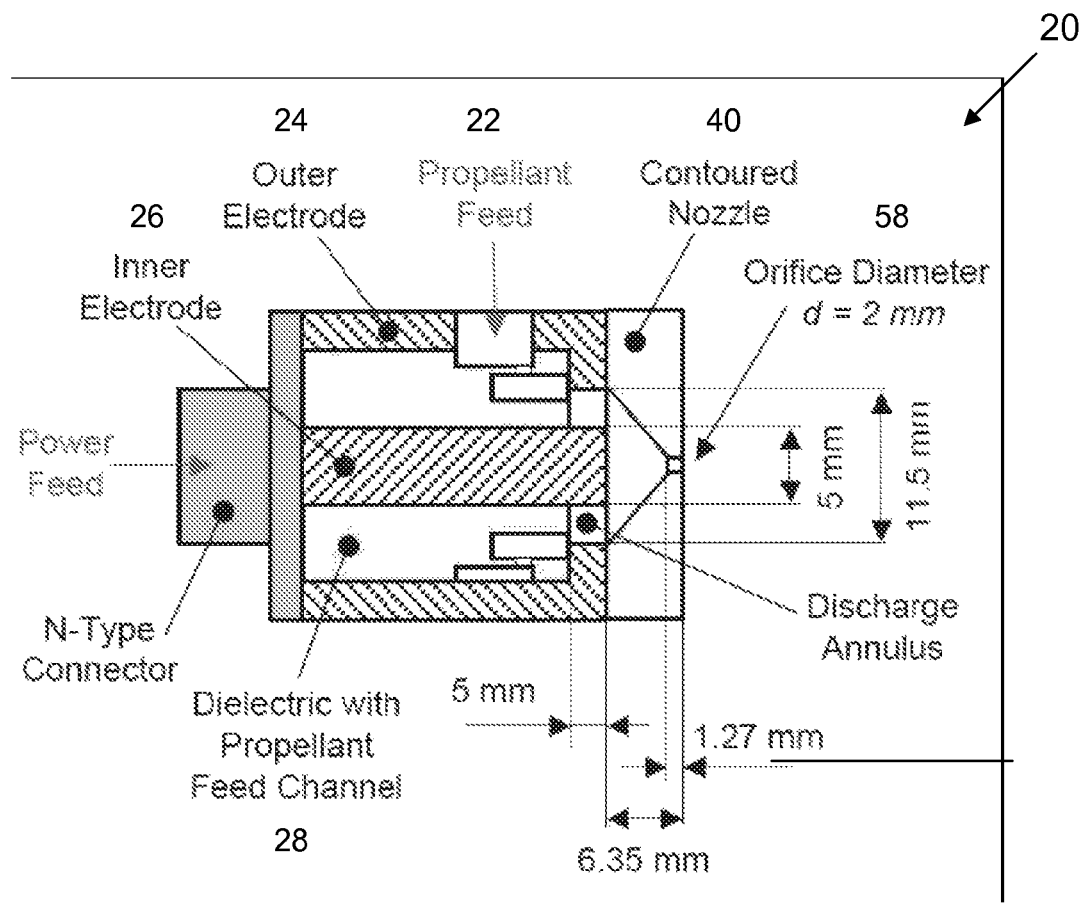
FIG. 1 is a schematic representation of an RFCCD microthruster.

| | | |
|---|---|---|
| $v_m$ | Neutral Gas Collision Frequency | $s^{-1}$ |
| $\tau_{coll}$ | Period Between Neutral Collisions | s |
| $T_0$ | Stagnation Temperature | K |
| $\vec{F}$ | External Force | N |
| $\alpha$ | Accommodation Coefficient | [ ] |
| $\vec{u}, \vec{v}$ | Fluid Velocity | $ms^{-1}$ |
| $\Delta t$ | Time-step | s |
| $\Delta x$ | Length-step | m |
| $\dot{m}$ | Mass Flux | $kgs^{-1}$ |
| $\gamma$ | Ratio of Specific Heats | [ ] |
| $\lambda_{ng}$ | Neutral Mean Free Path | m |
| $\mu_{ref}$ | Reference Viscosity (300 K) | $Nm^{-2} s$ |
| $\rho$ | Fluid Density | $kgm^{-3}$ |
| $\tau_{res}$ | Particle Residence Time within a Cell | s |
| $\vec{x}$ | Position Vector | [m] |
| $A^*$ | Sonic Area | $m^2$ |
| $C_D$ | Discharge Coefficient | [ ] |
| $D_{th}$ | Throat Diameter | $m^2$ |
| F | Thrust | N |
| $F_c$ | Cold Gas Thrust | N |
| $F_{cb}$ | Pressure Thrust, Center-Body | N |
| $F_{jet}$ | Jet Thrust | N |
| $F_{jp}$ | Pressure Thrust, Jet | N |
| $F_{np}$ | Pressure Thrust, Nozzle Back Face | N |
| g | Gravitational Constant | $ms^{-2}$ |
| $I_{sp}$ | Specific Impulse | s |
| m | Neutral Particle Mass | kg |
| $N_c$ | Number of Particles per Computational Cell | [ ] |
| $n_g$ | Neutral Gas Number Density | $m^{-3}$ |
| P | Pressure | Torr |
| $P_c$ | Chamber Pressure | Torr |
| $P_0$ | Stagnation Pressure | Torr |
| PFnum | Number of Molecules Represented by a Computational Particle | [ ] |
| Q | Volumetric Flow Rate | sccm |
| R | Gas Constant | $Jkg^{-1}K^{-1}$ |
| T | Neutral Temperature | K |
| $T_x$ | $\hat{x}$ Component of Temperature | K |
| $v_r$ | Relative Velocity | $ms^{-1}$ |
| $v_x$ | $\hat{x}$ Component of Velocity | $ms^{-1}$ |
| $v_{ng}$ | Neutral Velocity | $ms^{-1}$ |

Table of Relationships $$Re = \frac{m n_{ng} v_x D_{th}}{\mu_{ref}}$$

$$F = I_{sp} \dot{m} g$$

Isentropic Choked Flow through a Smooth Nozzle:

$$\dot{m} = \left(\frac{2}{\gamma+1}\right)^{\frac{\gamma+1}{2(\gamma-1)}} \sqrt{\frac{\gamma}{RT_0}} P_0 A^*$$

Table of Relationships

Converging Nozzle:

$$gI_{sp} = \sqrt{\frac{2RT_0(\gamma+1)}{\gamma}}$$

Converging Diverging Nozzle:

$$gI_{sp} = \sqrt{\frac{2RT_0 \gamma}{\gamma-1}}$$

Free Molecular Orifice:

$$\dot{m} = \left(\frac{1}{\sqrt{2\pi RT_0}}\right)(P_0 - P_a)A^*$$

$$gI_{sp} = \frac{1}{2}\sqrt{2\pi RT_0}$$

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that must be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only. Further, discussion pertaining to a specific composition of matter, that description is by example only, does not limit the applicability of other species of that composition, nor does it limit the applicability of other compositions unrelated to the cited composition.

Various embodiments of the present invention pertain to improved configurations of flowpath for microthrusters. In some embodiments, it has been found that for microthrusters having a relatively low exit Reynolds number (RE<1000) an improvement in specific impulse can be achieved with various configurations of a center body placed within the microthruster. In yet other embodiments, the specific impulse of the microthruster can be improved by the addition of certain configurations of an aft body located aft of the exit plane from the microthruster.

The configurations of the microthruster described herein are applicable to both cold gas systems and also to various systems that impart additional energy to the propellant. Although some specific energy addition systems are described in some detail, the present invention is not so constrained, and contemplates usage with a variety of microthruster arrangements. Further, although specific test results are described, these are by way of example only, and should not be construed as limiting.

In one embodiment, it has been discovered that additional thrust can be captured for thrusting devices operating under conditions of low ambient pressure, such as upper altitudes of the atmosphere or the vacuum or near-vacuum of outer space. In one embodiment, the gas exiting the nozzle of the thrusting device and flowing into low pressure ambient conditions can produce a net thrust of relatively small magnitude. However, in case of a microthruster, this small additional pressure thrust can be a large improvement in overall thrust, and therefore an increase in specific impulse. It has been found that under such conditions, and especially in those nozzles having an exit comprising a centerbody within an annulus, that the exiting gas can place a static pressure against the aft-facing end of the centerbody to produce additional thrust. This pressure-generated thrust is in addition to the typical jet thrust and pressure thrust achieved in some types of propulsion devices.

There are two types of thrust generated by nozzles of most typical engines: jet thrust and pressure thrust. In the three equations that follow, the following nomenclature is used: F=net force; v=velocity; Pe=exit pressure; Pa=ambient pressure; Ae =area of the exit; and Int=integration. Using the typical thrust equation:

$$F=(\text{mass flowrate})(v)+(Pe-Pa)(Ae)$$

Jet thrust is the product of (mass flowrate) and velocity, and pressure thrust is the product of the overall pressure difference (Pe-Pa) and (Ae). This equation works for most rocket engines, especially those that operate in an atmosphere.

For the various nozzles according to different embodiments of the present invention, thrust is also generated via a small pressure rise due to the exhaust which acts along the backface of the nozzle itself. This appears in some embodiments when the nozzle is in a near vacuum. There can be a pressure of less than about one Torr along the face of the nozzle where the exhaust expands. This small pressure difference generates thrust as well, although the overall magnitude of the thrust is small.

In higher energy applications, this small pressure difference may represent only about 1-2% of the thrust, which is negligible in some applications. One could rewrite the above equation as:

$$F=(\text{mass flowrate})(v)+(Pe-Pa)(Ae)+(Pbn-Pa)(Abn)$$

where Abn is the area (not including the nozzle exit) of the backface of the nozzle where Ae+Abn=total nozzle cross sectional area. Pbn is the pressure along Abn.

The various embodiments shown herein show that coaxial micronozzle concepts using center-body geometries can potentially provide thrust in the milli-Newton range while achieving significant improvements in specific impulse compared to typical converging nozzle cold gas thrusters. Changes in throat diameter, the geometry of the converging section and the addition of a diverging section provide little improvement over a comparable converging nozzle at these operating conditions. The addition of blunt center-bodies increases the pressure thrust due to the creation of a recirculation/stagnation zone aft of the center-body. This increase in pressure thrust is of the same magnitude as the jet thrust, thus nearly doubling the thrust level for the same mass flow rate. Short center-bodies perform better than longer center-bodies due to a reduction in viscous losses and better capture of the flow expansion. This performance improvement is especially applicable at low Reynold's numbers, low thrust, and vacuum conditions.

The main power bus of a typical microspacecraft operates below 100 V and may deliver power levels up to only 100 W. Many state-of-the-art micropropulsion systems utilize electrostatic acceleration mechanisms to generate thrust, namely ion, Hall, field effect electric propulsion (FEEP), and colloid thrusters. Other successful micropropulsion systems encompass micro pulsed plasma thrusters (μPPT), vacuum arc thrusters (VAT) and microwave electrothermal thrusters (MET). All of these systems require high operating voltages (hundreds to thousands of volts), all of which exceed available voltages on microspacecraft. Power processing units (PPU) should provide voltage conversions between the main bus and the microthruster, thus adding to the cost and weight of the spacecraft. Extremely high potential differences can also be present, thus increasing the risk of undesirable discharges which can damage sensitive instrumentation or compromise satellite subsystems. Further, these high voltages preclude a direct-drive scheme, which could reduce the amount of power processing to an absolute minimum. A survey of current electric micropropulsion options is given in Table 1 where representative chemical micropropulsion systems (cold gas, mono and bipropellant) are also included for comparison.

TABLE 1

A Survey of Current Micropropulsion Options

| | Thruster | | | | | |
|---|---|---|---|---|---|---|
| | Electrostatic | | Electromagnetic | Electrothermal | Chemical | Liquid |
| Technology | Hall/Ion | FEEP/Colloid | μPPT VAT | MET μResistojet | Cold Case | Liquid |
| Thrust | 1-20 mN | 1 μN-1.5 mN | 0.03-2 mN | ≤5 mN | 0.5-50 mN | 1 μN-200 mN |
| Isp | 1,00-3,700 s | 450-9,000 s | 200-3,000 s | 50-250 s | 40-80 s | 100-315 s |
| Power | 50-300 W | 1-100 W | ≤10 W | 5-300 W | — | — |
| Voltage | 100-1,000 V | kV-10 s kV | kV | 1-10 V* | — | — |
| Size | ≤5 cm φ | ≤800 cm$^3$ | — | 1-25 cm$^3$ | 0.1-10 cm$^3$ | 0.1-10 cm$^3$ |
| Mass | ≤1 kg | 0.1-1 kg | 0.06-0.5 kg | 0.1-1 kg | 0.01-0.5 kg | 0.01-0.5 kg |

*DC voltage for μResistojets.

Electric micropropulsion systems can afford significantly higher specific impulse over chemical propulsion systems yielding a substantial reduction in the propulsion system wet mass, but it is preferred that the thruster's power subsystem does not outweigh this benefit. The power supply for an electric thruster is the largest contributor to the propulsion subsystem with regard to mass and volume. On average, thruster power supplies are two to three times more massive than the thruster itself.

In one embodiment, a RFCCD microthruster was designed. Proof-of-concept experimentation was performed, testing the validity of the RFCCD concept and exploring initial characteristics of the discharge experimentally. A reduced-order continuum model was also created and used to investigate general trends in microthruster performance. A kinetic model was subsequently developed to more intricately simulate RF gas discharges and apply it microthruster performance. This model consisted of a Particle in-Cell/Monte-Carlo-Collision method for simulating the plasma discharge and coupled with a Direct-Simulation Monte Carlo method to simulate the flow through the micronozzle. Studies were performed to understand the effect each input variable, namely electrode geometry, pressure, applied voltage, RF frequency and plasma neutral heat transfer, has on the dynamics of the gas discharge. Overall microthruster performance was also investigated and compared with current electric micropropulsion systems. Effort was also applied to improving performance through micronozzle design. This included using a combination annular nozzles and centerbodies to better implement pressure thrust and improve flow characteristics of the nozzle.

Figure 2:
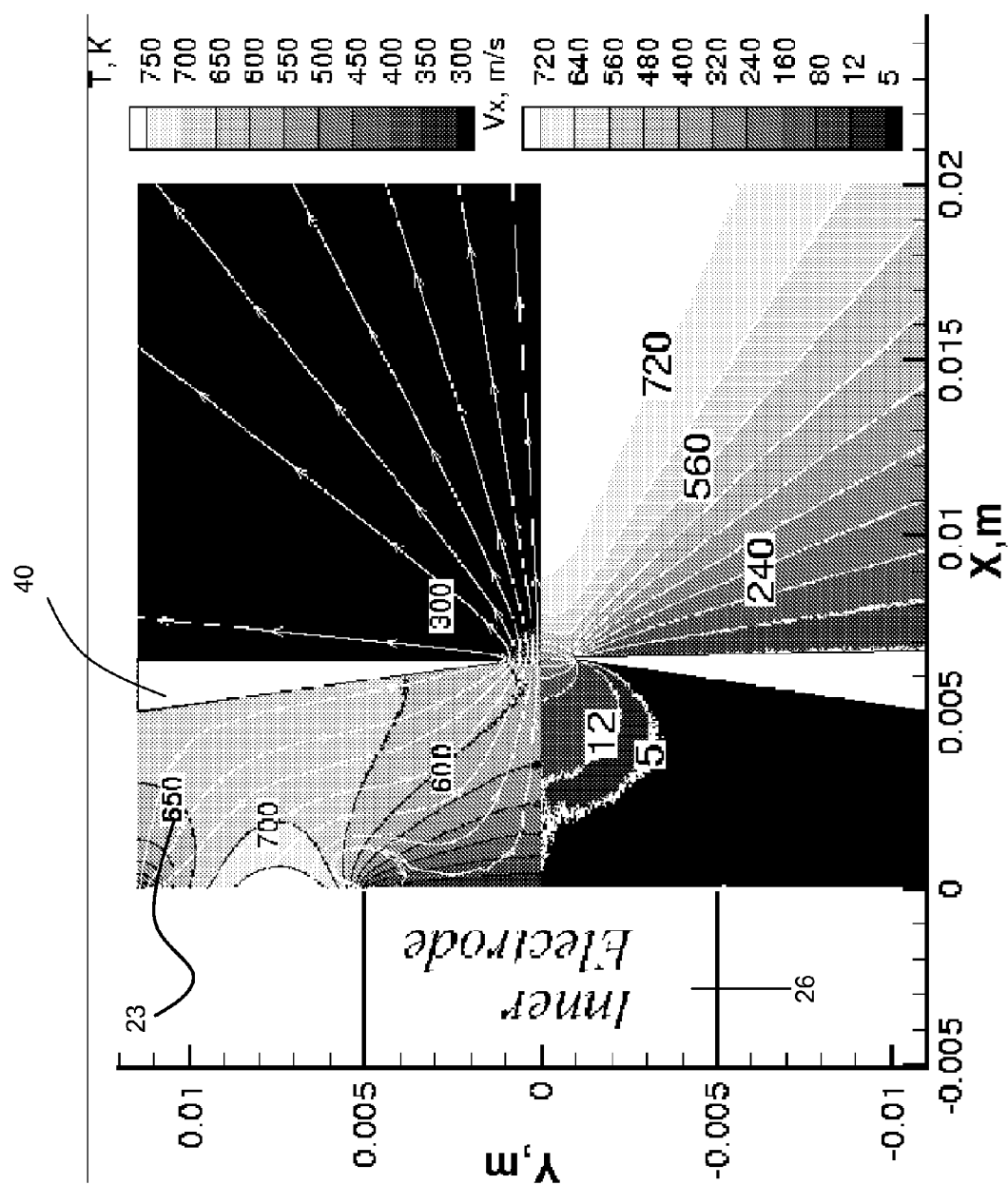
FIG. 2 is a graphical representation of the analytical predictions for a sharp converging nozzle, 2 mm throat diameter.

The thruster 20 according to one embodiment of the present invention is comprised of four main parts: an inner 26 and outer 24 electrode, a dielectric separator 28, and a nozzle 58. FIG. 2 shows a schematic representation of a thruster according to one embodiment of the present invention. Although what has been shown and described is a thruster including an electrode, the present invention is not so limited, and contemplates the use of any means to add energy to the fluid, and further includes the use of cold gas.

The inner (1) and outer electrodes (3) are constructed from aluminum and are separated by a distance dictated to provide approximately 50 impedance in vacuum. The impedance of two concentric, coaxial electrodes 24 and 26 is defined as:

$$Z = \frac{\eta}{2\pi} \ln\left(\frac{R_1}{R_0}\right) \quad (3.1)$$

Thus, for a desired impedance of 50 the ratio of outer and inner radii is approximately $R_1/R_0=2.301$. Both electrodes are attached via an N-Type connector to an RF power supply system. The separator (28) which is constructed using a dielectric to both electrically isolate each electrode and maintain the proper distance between them. The separator also provides a means of coaxially injecting the propellant into the discharge chamber. Garrolite (G-10) was chosen to provide good electrical insulation while minimizing any out gassing. The nozzle (4) in one test was constructed from polycarbonate for internal viewing of the plasma as well as providing a means to properly choke the exhaust. Different nozzles can be interchanged via four easily accessible bolts on end of the thruster without any changes to the thruster itself. Using a dielectric as a nozzle also provided little interaction with the electric field, allowing the discharge to be as radial as possible. This arrangement also required only two O-rings to properly seal the microthruster; both sealing the separator and the nozzle against the outer electrode housing.

The experimental setup for this research is comprised of four major sections, the vacuum system, propellant feed system 22, RF power system, and the test stand. A discussion and schematic of the experimental setup is provided in U.S. Provisional Patent Application Ser. No. 61/127,553, filed May 14, 2008, incorporated herein by reference.

Initial experiments were performed using the aforementioned system in conjunction with the baseline thruster. Plasma ignition was successfully achieved using both argon and nitrogen. Further discussion of test results can be found in U.S. Provisional Patent Application Ser. No. 61/127,553, filed May 15, 2008, incorporated herein by reference.

The Direct Simulation Monte Carlo (DSMC) method is applied to model the neutral gas expansion in the microthruster nozzle. This type of approach is required due to significant rarefaction of the flow within the operating pressure range (mTorr–Torr) of the nozzle. The value of the Knudsen number based on an orifice diameter of 2 mm is about 0.04 at P=1 Torr and T=300 K, and increases for higher temperatures and lower pressures.

Figure 3:
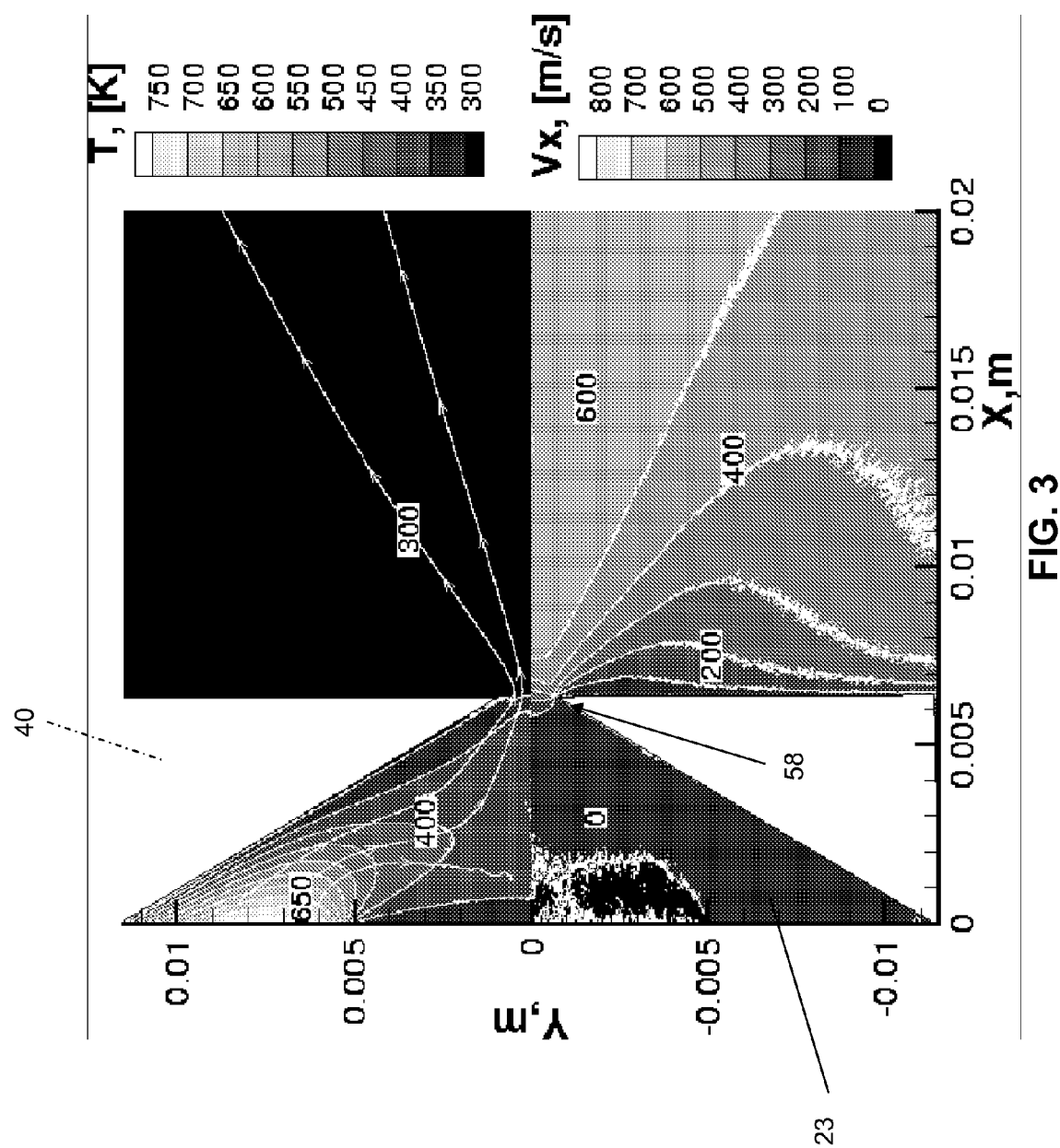
FIG. 3 is a graphical representation of the analytical predictions for a scaled experimental nozzle, 1.3 mm throat diameter.

DSMC modeling was applied to obtain flowfields and thruster performance at the designated design conditions of 3 Torr, 500 V, 5 mm, and 200 MHz. The DSMC computational domain is shown in both FIGS. 2 and 3 and extends from the exit of the discharge chamber 30 and inner electrode 26 at the left ($\chi=0$) to the converging nozzle 40 (shown in gray) through which the flow expands into a vacuum. The inflow boundary at $\chi=0$ corresponds to a constant pressure of 3 Torr, zero velocity and gas temperature distributions obtained via particle-in-cell (PIC)/Monte Carlo collision (MCC) simulations using both temperature models as discussed above.

One mechanism for performance gain is through plasma heating of the propellant by the discharge, but microthruster performance is also affected by heat transfer to the nozzle walls. The effect of heat loss was investigated by considering two different thermal conditions at the nozzle wall boundaries and using temperature distribution derived from the PIC results using the constant temperature model. The adiabatic nozzle wall is modeled using a zero energy accommodation coefficient in the Maxwell gas-surface interaction model. Another case was considered with a cooled nozzle wall where it was set to a constant temperature of 300 K. The results of these analyses are given in Table 2.

It can be seen that utilizing an RFCCD can provide notable improvement over that of a cold gas expansion. Heat transfer within the discharge as well as between the discharge and the thruster walls can also have a significant impact on the microthruster performance.

TABLE 2

RF thruster performance at 3 Torr, 5 mm, 500 V, 200 MHz, 2 mm throat diameter, sharp converging nozzle

| Case | $T_{de}$ [K] | F [mN] | $\dot{m}$ [mg/s] | $I_{sp}$ [s] | $I_{sp}$ Improvement over Cold Gas |
|---|---|---|---|---|---|
| DSMC Results with RF Discharge Model | | | | | |
| 300 K wall, CT3K | 1,990 | 1.29 | 2.25 | 58.2 | 31% |
| Adiabatic wall, CT3K | 1,990 | 1.12 | 1.27 | 89.5 | 102% |

TABLE 2-continued

RF thruster performance at 3 Torr, 5 mm, 500 V,
200 MHz, 2 mm throat diameter, sharp converging nozzle

| Case | $T_{de}$ [K] | F [mN] | $\dot{m}$ [mg/s] | $I_{sp}$ [s] | $I_{sp}$ Improvement over Cold Gas |
|---|---|---|---|---|---|
| 300 K wall, GHT | 600 | 1.00 | 1.73 | 58.6 | 32% |
| Adiabatic wall, GHT | 600 | 1.25 | 2.00 | 63.8 | 44% |
| Cold Gas Expansion | 300 | 1.33 | 3.05 | 44.3 | |
| Ideal Nozzle Results | | | | | |
| 300 K Expansion | 300 | 1.9 | 3.7 | 51.3 | |
| 600 K Expansion | 600 | 1.8 | 2.5 | 72.5 | |

RFCCD microthruster performance can be compared with other existing low-power, electric micropropulsion systems and is provided in Table 3. RFCCD microthruster underperforms all the compared systems. The RFCCD microthruster performance can be improved via different means.

TABLE 3

Comparison of RFCCD Thruster Performance with Similar Microthrusters

| Type | $P_{in}$ [W] | F [mN] | $\dot{m}$ [mg/s] | $I_{sp}$ [s] | $\eta_{th}$ | $Re_c$ | Propellant |
|---|---|---|---|---|---|---|---|
| RFCCD | 44 | 0.70 | 1.32 | 54 | 0.16% | 70 | Ar |
| MET [71] | 9 | 1.10 | 1.36 | 73 | 4.20% | 409 | Ar |
| MAT [72] | 80 | 42.5 | 3.53 | 1300 | — | — | $N_2$ |
| VLP Arcjet [72] | 35 | 13.5 | 5.00 | 275 | 0.38% | 1002 | $N_2$ |
| 50 W Hall [72] | 41.7 | 0.63 | 0.10 | 641 | 4.75% | 1.3 | Xe |

Operating the microthruster at higher pressures would not only increase the discharge's ability to transmit power into the fluid, but decrease viscous losses and achieve a supersonic flow in the nozzle expansion. For a thruster according to the embodiments disclosed herein, the Reynolds number at the orifice plane is preferably below about 100. However, yet other embodiments of the present invention are applicable to an Re from about 10 to about 1000. For yet other embodiments, it is believed that the range of Re extends up to about 10,000. At such low Reynolds number, viscous losses are large and the efficiency of converging-diverging nozzle is lower than that of an orifice expansion. The experimental and numerical results for gas expansion through nozzles and orifices at low Reynolds numbers indicate that in order to achieve a supersonic flow the pressure has to be increased by a factor of about six.

Many of the compared microthrusters operate at higher Reynolds numbers and thus can better utilize a converging-diverging nozzles to increase performance. It is believed that any of the types of thrusters referred to in Table 3, as well as the micropropulsion systems discussed in Table 1, can benefit from the nozzles and methods disclosed herein. Operating the other thrusters with nozzles similar to that used in the above analysis would provide better comparative insight between the systems.

While the coaxial RFCCD microthruster has some advantages over other competing systems, it also provides one opportunity for the use of unconventional nozzles due to the coaxial nature of the discharge. This allows other nozzle designs besides a traditional converging nozzle to be employed for improved nozzle performance. However, the other types of thrusters and micropropulsion systems described herein can also be modified to include coaxial discharges.

Traditionally, chemical propulsion systems use converging-diverging de Laval nozzles which efficiently convert a higher pressure into kinetic energy to provide thrust. Initial flow enters the nozzle at low subsonic speeds and at pressures much higher than ambient conditions. The flow is accelerated through a convergent section and becomes sonic near the nozzle throat. The flow is further expanded through a diverging region to higher supersonic speeds. Traditional space propulsion systems typically operate with high exhaust velocities and moderate to large length scales, resulting in high Reynolds numbers. Thus, viscous effects are small and the flow can be approximated as largely inviscid.

Developing supersonic micronozzles present difficult design challenges when compared to larger nozzles. Micronozzles have much smaller length scales (mm-µm) and thus the corresponding Reynolds numbers are low: typically Re<500. This reduces performance of converging-diverging nozzles due to increased friction losses. In such micronozzles operating at low pressures, it is not uncommon for the viscous boundary layer to occupy a sizeable portion of the cross-section of the diverging part of the nozzle. Heat transfer within the micronozzles becomes problematic as the thermal mass of the flow is reduced and the surface-to-volume ratio increases. Also, rarefied flow effects become a concern as the mean free path of the fluid approaches that of the characteristic length scales of the micronozzle. To reduce viscous effects within the micronozzle, various configurations of convergent section, throat, and divergent section, along with centerbodies and aft bodies, are disclosed herein as various embodiments of the present invention.

Aerospike and plug nozzles have been historically used with higher Reynolds number systems in the past. One aspect of such nozzles resides in their pressure compensating ability. The lack of an enclosed divergent section allows the flow to conform more freely to the ambient pressure, which can improve performance over a range of pressure conditions.

However, pressure compensation may not a major concern of micronozzle design, since most micronozzles operate specifically in vacuum. However, utilizing a centerbody for expansion provides the ability to reduce the surface area of the nozzle and thus reducing viscous losses. Another means of increasing the nozzle performance is to utilize pressure thrust more effectively. Due to the operating environment of microthrusters and their subsequent thrust levels, the pressure thrust component can be a significant portion of the overall thrust. While it is understood that viscous losses dominate low Reynolds number flow, little information is present on designing a microthruster nozzle which better utilizes pressure thrust itself to improve performance.

Thus, a more efficient nozzle for an RFCCD microthruster is sought using DSMC simulations. Nozzle geometries are derived from simulations used to validate the DSMC using cold gas data, and thus are meant to be similar to existing micronozzles used for experimentation. Simulation results are then compared with a baseline converging nozzle and are presented in Table 4.

TABLE 4

Micronozzle Performance for Different Geometries,
[≈5.2 Torr Chamber Pressure, 3.175 mm Inner Radius]

| Micronozzle Design | Re | Kn | ṁ [mg/s] | F [mN] | $F_{jet}$ [%] | $F_{jp}$ [%] | $F_{np}$ [%] | $F_{cb}$ [%] | $I_{ep}$ [s] | Improvement over Baseline |
|---|---|---|---|---|---|---|---|---|---|---|
| Baseline | 70 | 14E−3 | 0.93 | 0.41 | 54 | 44 | 2 | — | 45.96 | — |
| *Traditional Variations* | | | | | | | | | | |
| Orifice | 52 | 28E−3 | 0.63 | 0.32 | 67 | 32 | 1 | — | 52.80 | 15.1 |
| Con.-Div. | — | — | 1.12 | 0.52 | 91 | 9 | — | — | 47.32 | 3.0 |
| *Throat Variations* | | | | | | | | | | |
| Half Throat | 34 | 29E−3 | 0.22 | 0.10 | 52 | 43 | 5 | — | 45.66 | −0.7 |
| 2x Throat | 140 | 7E−3 | 3.78 | 1.72 | 54 | 45 | 1 | — | 46.33 | 0.8 |
| 4x Throat | 268 | 4E−3 | 14.59 | 6.63 | 55 | 45 | 0 | — | 46.31 | 0.8 |
| 8x Throat | 424 | 2E−3 | 43.51 | 19.07 | 54 | 46 | 0 | — | 44.67 | −2.8 |
| *Convergent Section Variations* | | | | | | | | | | |
| Conv. Nozzle 1 | 70 | 14E−3 | 0.94 | 0.42 | 53 | 45 | 2 | — | 45.93 | −0.1 |
| Conv. Nozzle 2 | 70 | 14E−3 | 0.94 | 0.42 | 53 | 45 | 2 | — | 45.88 | −0.2 |
| Conv. Nozzle 3 | 58 | 15E−3 | 0.85 | 0.38 | 53 | 45 | 2 | — | 45.61 | −0.8 |
| *Center-Body Variations* | | | | | | | | | | |
| Annular Nozzle | 29 | 38E−3 | 0.81 | 0.86 | 26 | 15 | 3 | 56 | 108.70 | 135.5 |
| Conical 30 | 28 | 37E−3 | 0.81 | 0.64 | 34 | 21 | 5 | 40 | 81.20 | 76.7 |
| Conical 60 | 29 | 38E−3 | 0.81 | 0.88 | 25 | 15 | 3 | 57 | 111.00 | 143.1 |
| Biconical 60-30 | 28 | 38E−3 | 0.80 | 0.87 | 25 | 15 | 3 | 56 | 110.50 | 140.4 |

Figure 4:
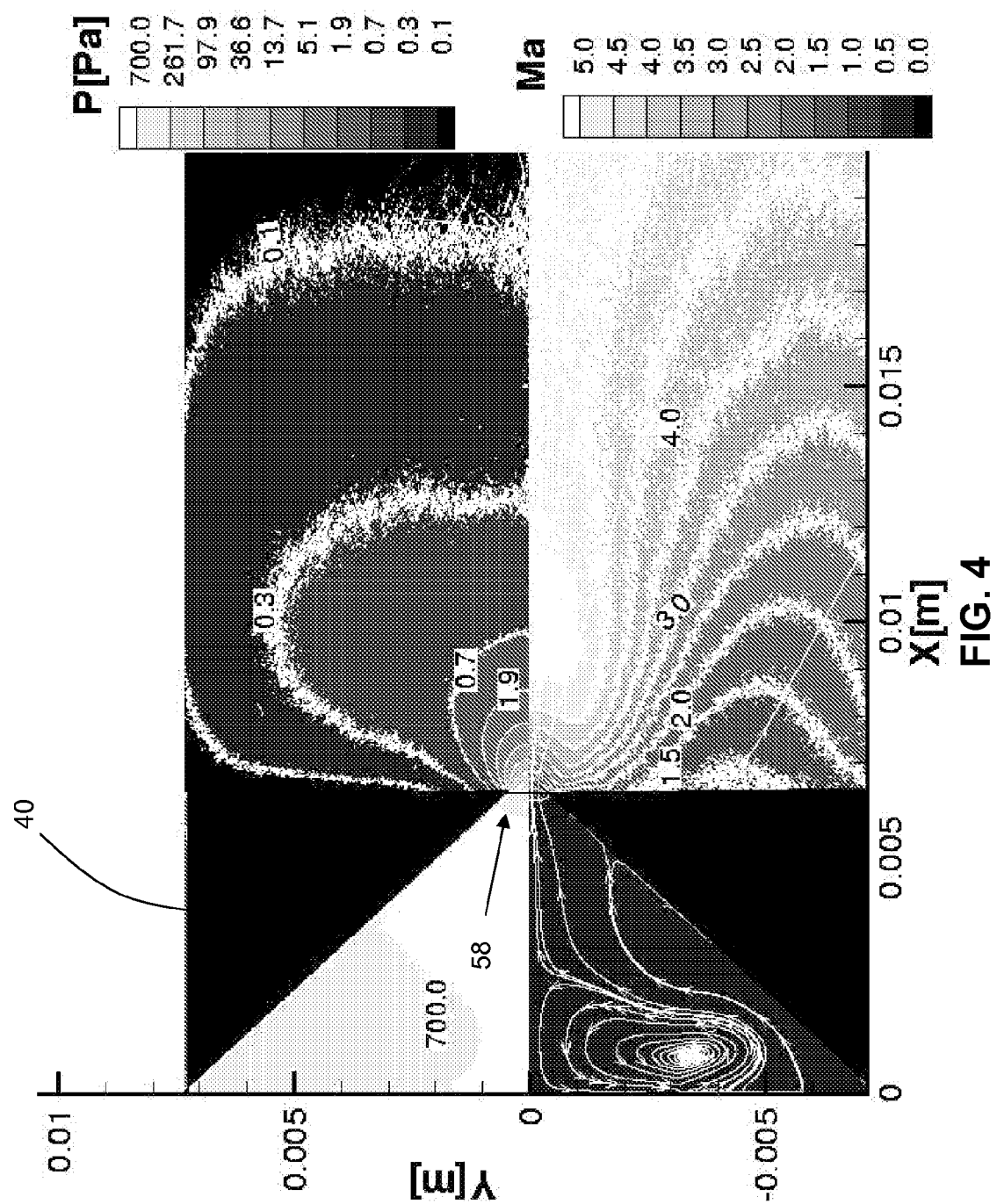
FIG. 4 is a graphical representation of the analytical predictions for a for baseline nozzle geometry.

Various inventive embodiments of micronozzle designs were considered in this study. Each of these embodiments or families deviate from the baseline design in a related fashion. The baseline nozzle design was based on an actual experimental nozzle that was validated using experimental cold gas data taken at the Air Force Research Laboratory (AFRL). Flowfield results form the baseline case are shown in FIG. 4.

The baseline nozzle can be divided into three major sections; the convergent section 40, the throat 50, and the divergent section 60. Nozzle families were created to of investigate geometry effects of each of these sections on micronozzle performance. This is done by comparing each micronozzle specific impulse to the baseline design, with aims of measuring the relative performance increase. The specific impulse of each nozzle is calculated in the traditional sense using the ratio of the total generated thrust to the massflow. It should be noted that the total generated thrust for a micronozzle operating at these conditions is comprised of three terms. The first two terms are the traditional jet and pressure thrust terms derived from momentum conservation of the fluid jet as it leaves the nozzle. An additional term is required which determines the resultant pressure thrust integrated over the entire external surface of the nozzle. This other "pressure thrust" acts on a solid surface, such as the end of a centerbody or on an aft body that is not in the bulk fluid (jet). Since this micronozzle operates in vacuum and at such low thrust levels, any pressure present on the back face of the nozzle $F_{np}$, can produce a non-trivial amount of thrust. Typical values of $F_{np}$ range on the order of a few percent of the total thrust for nozzle designs without divergent section, but can become much larger using other geometries (with a center-body for example).

Figure 5A:
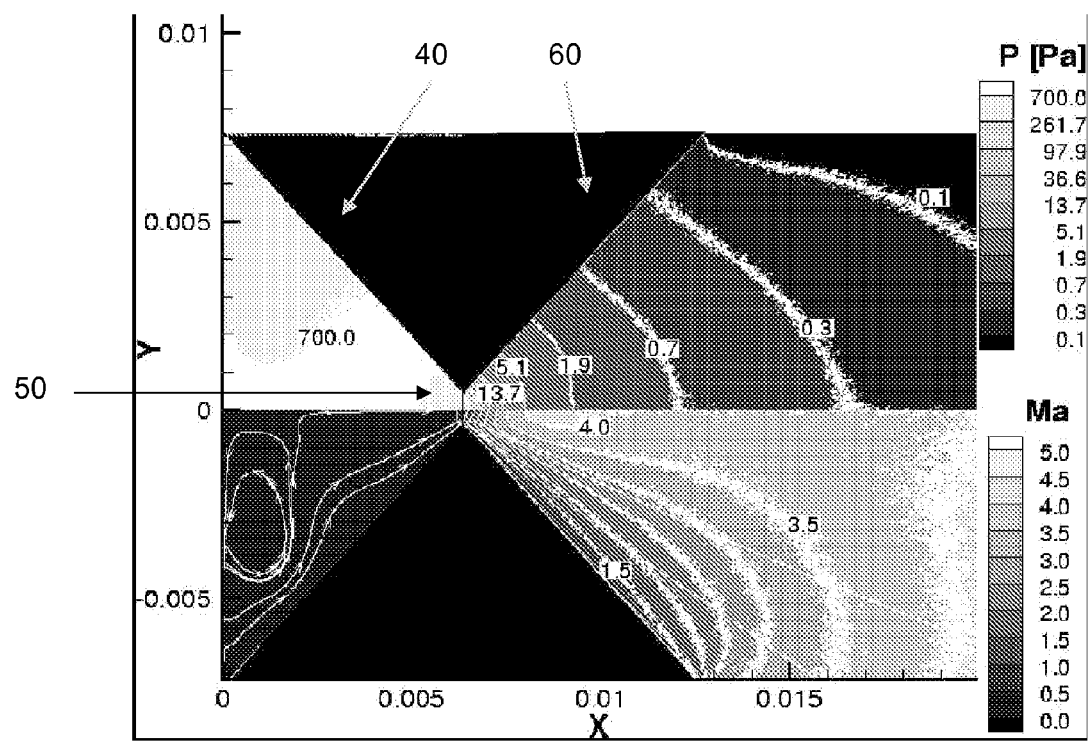
FIG. 5 show graphical representations of the DSMC calculated pressure contours (top, [Pa]); bottom Mach number contours and streamlines.
Figure 5B:
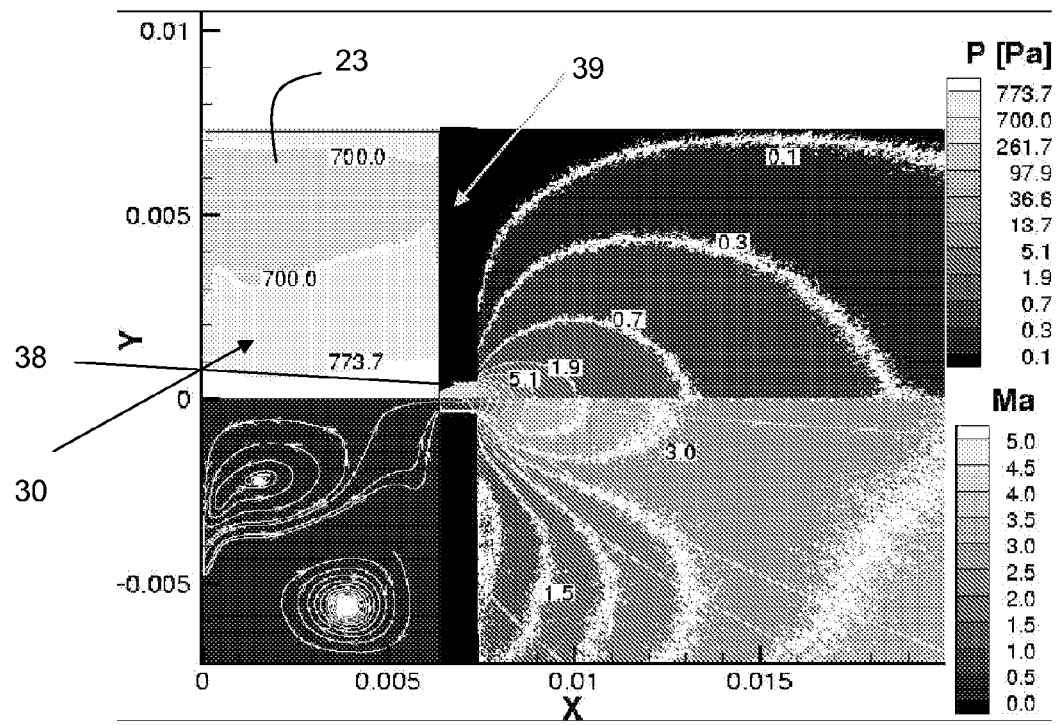

One family of inventive micronozzle designs considers traditional additions/changes in the design. These are primarily the addition of a divergent section of the nozzle or using a simple orifice to choke the flow. Table 4 shows a symmetric converging—diverging nozzle provides about a 3% increase in nozzle performance, while an orifice can provide about a 15% increase and is in accordance with previous studies. Flow field results for these cases are shown in FIGS. 5(a) and 5(b). FIG. 5(a) shows a converging section 40 leading to a throat 50, and a diverging section 60 for expansion of gas leaving the throat. FIG. 5(b) shows a plate 39 with a central orifice 38 for the flow of gas from chamber 30 to ambient conditions.

Figure 6A:
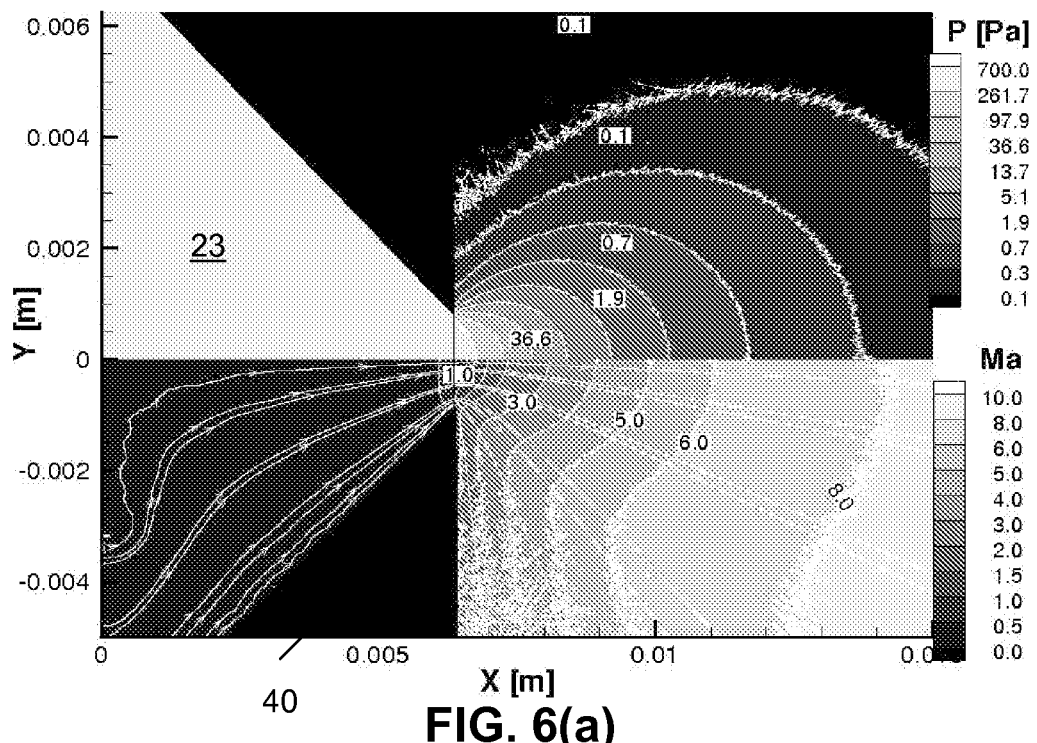
FIG. 6 show graphical representations of the DSMC calculated pressure contours (top, [Pa]), bottom, Mach number contours and streamlines for two different nozzles: (a) for a 2× throat diameter flow field; and (b) for an 8× throat diameter flow field.
Figure 6B:
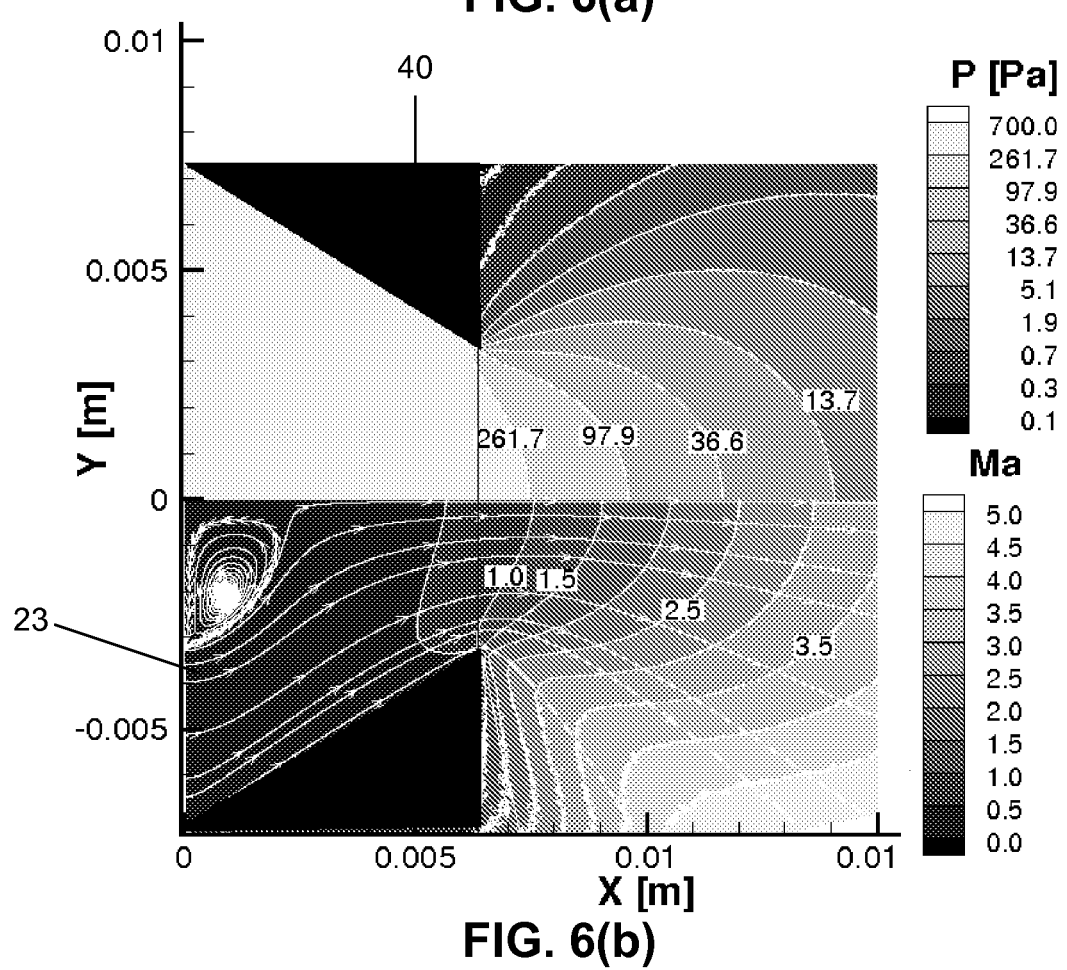

Another family of inventive nozzle designs considers changes in the throat diameter of the micronozzle. The original experimental nozzle used no means to size the throat and was made small to ensure choking. Thus, this family of micronozzle designs investigates throat diameters which may improve micronozzle performance. This was achieved by increasing and decreasing the throat diameter for a similar converging geometry and observing the effect on performance. FIGS. 6(a) and 6(b) illustrate that the current nozzle diameter can be increased to further improve performance. Increasing the throat diameter reduces boundary layer effects and increases the throat Reynolds number. Micronozzle performance can decrease if the diameter becomes too large, thus illustrating there is an optimum nozzle diameter between about 3.33 mm and 6.60 mm. Optimizing the throat diameter provides some benefit in terms of performance for this type of nozzle, generally resulting in a change of ≈±1%.

Figure 7:
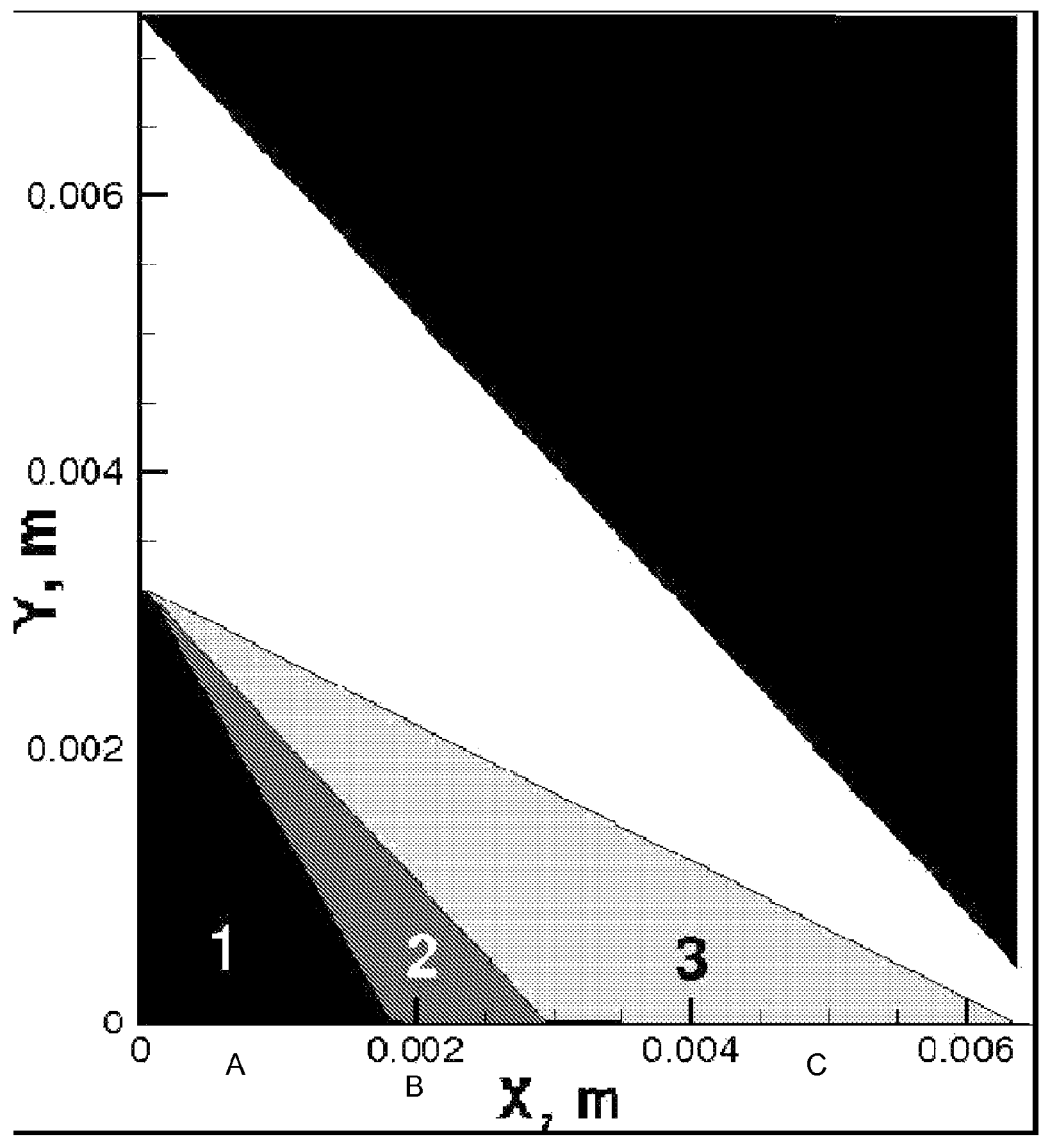
FIG. 7 shows an overlay of various nozzle schematics for converging nozzle cases.

Yet another family of inventive micronozzle designs investigates flow characteristics within the convergent section of the micronozzle. This family explored the possibility of reducing the impact of the recirculation region due to flow separation of the inner electrode as it leaves the discharge chamber (shown in FIG. 4). Three geometries were investigated; one (A) with a small decrease in turning angle; (B) with the inner electrode and nozzle walls parallel; and (C) with the inner electrode extending into the throat itself. Schematics of these designs are given in FIG. 7. Some of these designs tended to reduce performance, which can be attributable to the relatively low velocities with respect to the throat velocity and increases in boundary layer thickness within the nozzle throat, thus reducing performance.

Figure 8A:
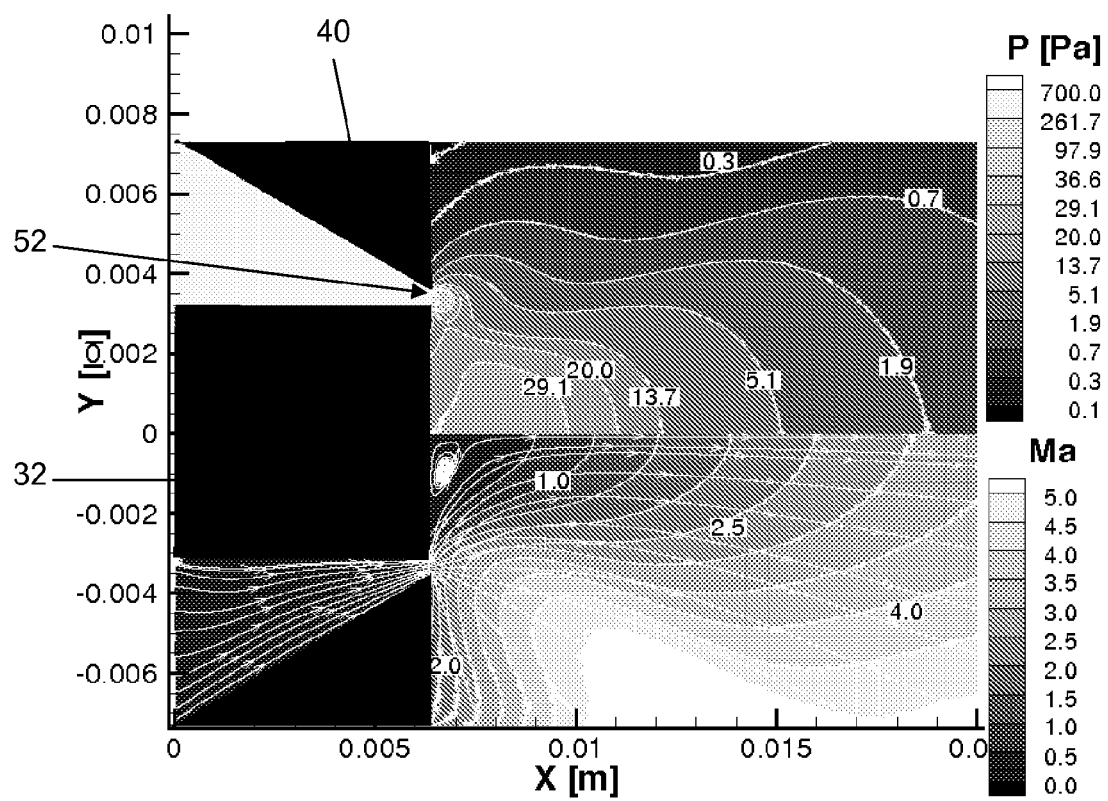
FIG. 8 show graphical representations of the DSMC calculated pressure contours (top, [Pa]), Mach number contours and streamlines (bottom) of various embodiments of the present invention for the following cases: (a) an annular nozzle flow field around a plug; (b) a conical center body having a 30 degree (half angle) flow field; and (c) a conical centerbody with a 60 degree (half angle) flow field.
Figure 8B:
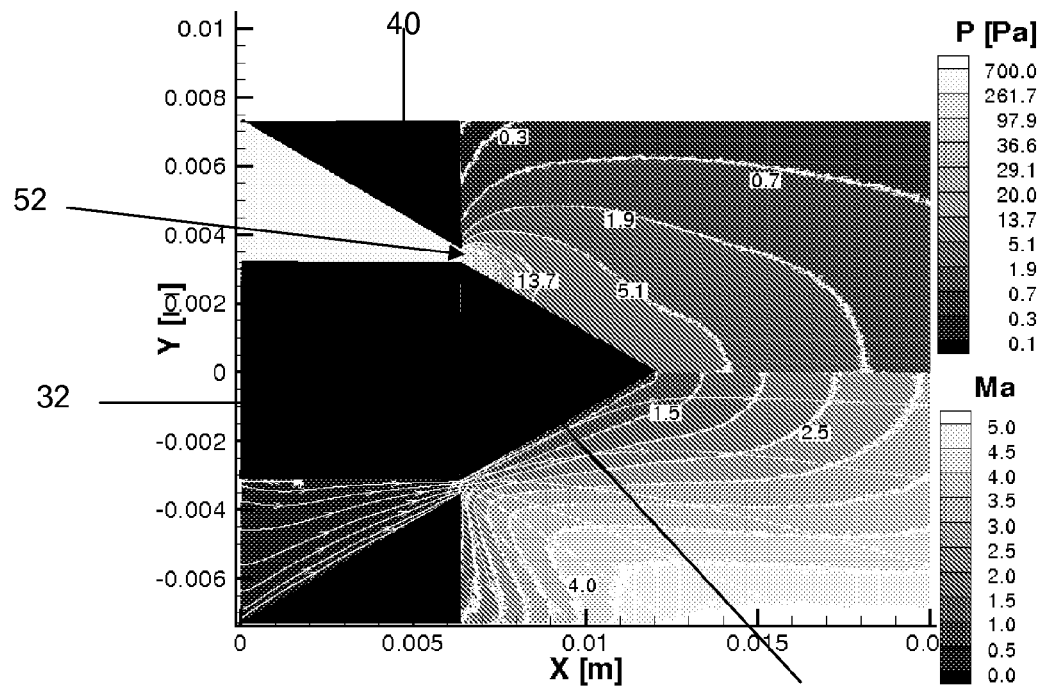

The last family of inventive micronozzle designs considers nozzles with a center-body added externally to a converging nozzle. Flow field results are shown in FIGS. 8(a) and 8(b), respectively, showing a flat faced centerbody 32 with discharge annulus 52 and a conical aft body 62 with discharge annulus 52, respectively, and show improved performance (>110%) over the baseline design. These nozzles have an "annular" design which better utilizes the flow geometry present in a coaxial arrangement. The nozzle provides a smooth transition between the discharge chamber and the nozzle throat, without flow separation. Due to the annular configuration, as the flow leaves the nozzle throat, it creates a recirculation region outside the nozzle itself. While this would be detrimental and most likely reduce nozzle performance under other circumstances (higher thrust levels or expanding into atmospheric conditions for example) this stagnation region produces an opportunity to generate "free" pressure thrust.

With regards to the flat faced centerbody 32 shown in FIG. 8(a), it can be seen that there is a small core of low velocity, higher pressure near the centerline of the centerbody. With regards to the conical aft body nozzle shown in FIG. 8(b), it can be seen that there is a region of high pressure and low velocity extending from the outer diameter of aft body 62 and reducing in magnitude toward the centerline of aft body 62.

As the flow exits the annular nozzle, it expands into itself along the centerline of the nozzle causing a "high pressure" region on the order of <0.25 Torr along the center-body compared to <0.02 Torr on the upper face of the nozzle. This creates about 0.5 mN of additional pressure thrust in vacuum. While the magnitude of the center-body thrust is small, it is large relative to the total thrust provided by the micronozzle itself (≈50%), and thus would not improve the performance of larger thrust nozzles.

Figure 8C:
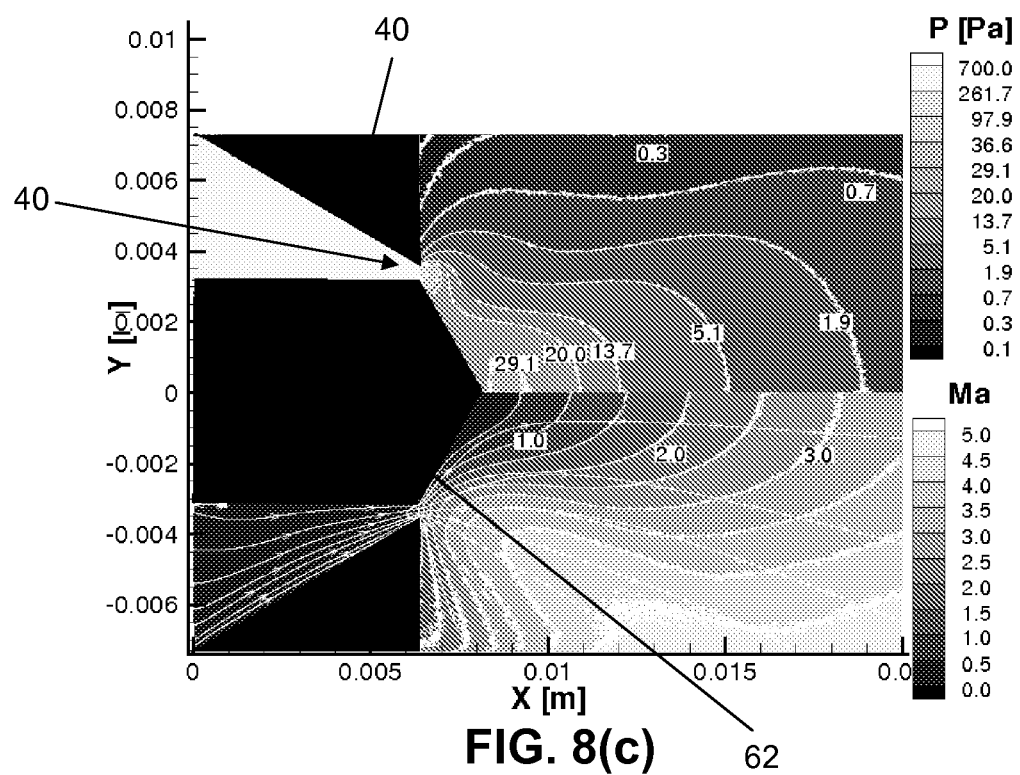

The four nozzle designs in this family explore different half-angles of the center-body in order to better exploit this additional pressure thrust. FIGS. 8(a) and 8(b) illustrate that nozzles with a higher half-angle, and thus more blunt, exploit the additional pressure thrust better than longer center-bodies with a smaller half-angle. Referring to FIG. 8(c) and Table 5, it can be seen that the blunter aft bodies (60° and biconical 60°-30° respectively) offer improved performance over the annular configuration of FIG. 8(a).

throat 250, after which center body 232 conically tapers inward in an aft section 235. The outer surface of portion 235 and the inner surface 256 of conversion section 240 form a divergent annular portion 272.

Various embodiments recognize that it is beneficial to angle the exhaust in on itself (i.e. to cause the flow as it exits to impinge on itself and to impinge on the aft face of the centerbody). In some embodiments, the flow expands into itself (such as with annular/conical designs) or the flow is angled towards the nozzle centerline to allow the flow to self-impinge. Other known design typically do not aim the nozzle exhaust plume in on itself to create more thrust. It is more commonly accepted that to create as much momentum as possible, the exhaust should be pointed generally axially. Traditional nozzles aim to increase jet thrust and axial momentum as much as possible. Nozzles according to some embodiments of the present invention trade-off some of the jet thrust to improve upon the additional pressure thrust available by turning the plume onto itself—the flow is angled towards the nozzle centerline to increase flow impingement.

Centerbodies according to some embodiments of the invention extend into a region of higher plume pressure, but the centerbody is not used to direct the flow, nor expand against it. Instead, some of the inventive geometries encourage the flow to self-impinge and create the higher pressure region aft of the exit. In some embodiment, the centerbody (and aft body in some embodiments) is extended and shaped to get close to the impingement point aft of the exit without excessively altering the flow structure. Some typical nozzles have the flow expand along the aerospike face, which is both undesirable for flows of low Re, and further doesn't allow the flow structure to self impinge.

For some of the inventive annular nozzle and the plug-annular nozzles presented herein, the flow can separate behind the centerbody, creating a recirculation zone which impinges on itself near the centerline of the nozzle. This reduces the flow velocity and creates a pocket of "higher" pressure which is used to create pressure thrust. The conical 60 and the biconical nozzles have aft faces that follow the flow

TABLE 5

Micronozzle Performance for Center-body Nozzles

| Case | Re | ṁ [mg/s] | F [mN] | $F_{jet}$ [%] | $F_{jp}$ [%] | $F_{np}$ [%] | $F_{cb}$ [%] | $I_{sp}$ [s] | Improv. over Baseline |
|---|---|---|---|---|---|---|---|---|---|
| Baseline | 72.1 | 0.959 | 0.435 | 53.8 | 45.1 | 0.95 | — | 46.2 | — |
| Annular Nozzle | 29.2 | 0.825 | 0.874 | 25.9 | 15.2 | 3.09 | 56.2 | 108 | 134 |
| Conical 30° | 28.5 | 0.813 | 0.652 | 33.8 | 20.9 | 4.93 | 40.4 | 81.8 | 77.1 |
| Conical 60° | 28.9 | 0.813 | 0.882 | 25.4 | 14.9 | 3.26 | 56.6 | 111 | 140 |
| Biconical 60°-30° | 28.8 | 0.814 | 0.886 | 25.3 | 14.9 | 3.10 | 56.7 | 111 | 140 |

Figure 11:
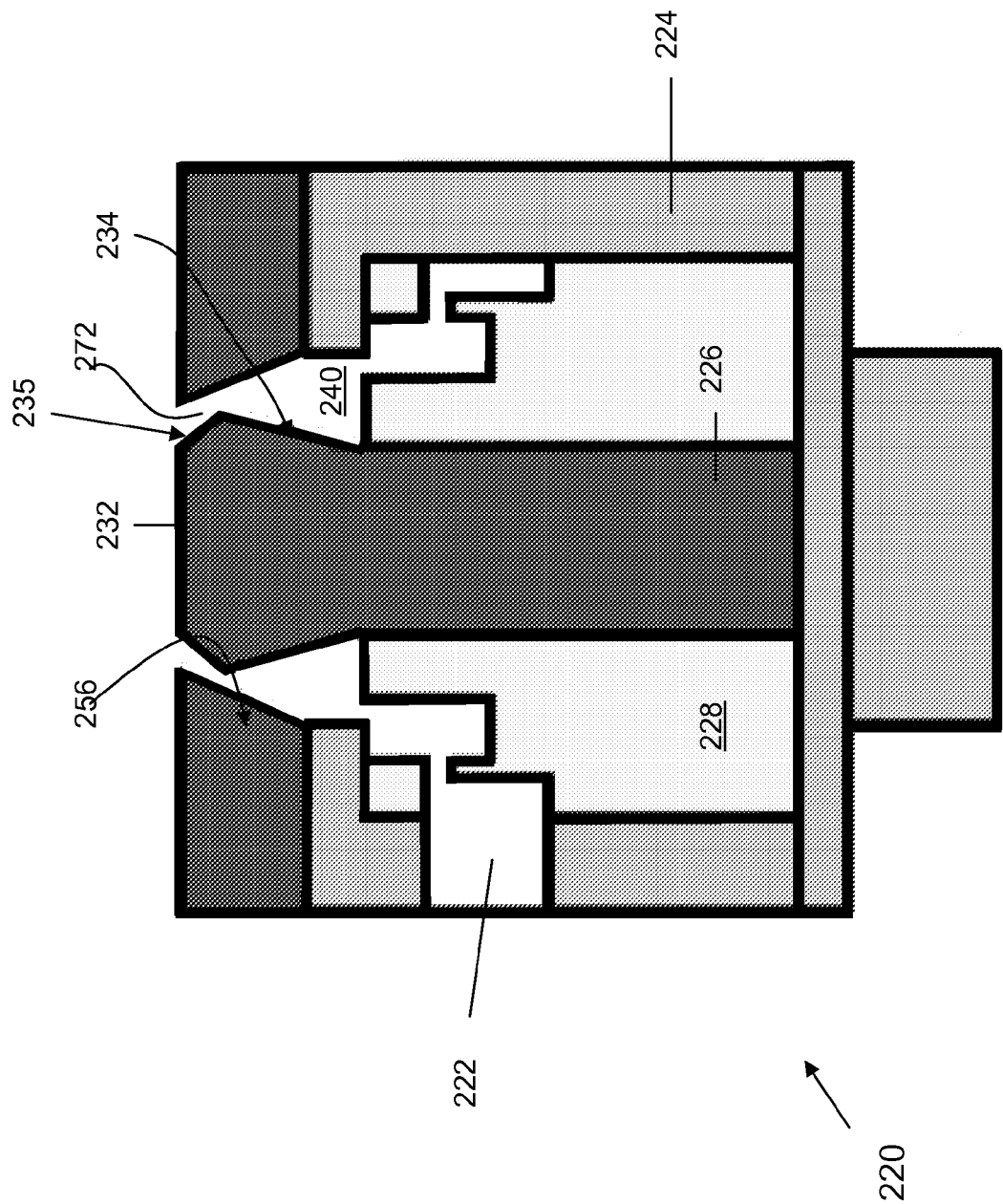
FIG. 11 is a cross sectional schematic representation of a microthruster according to another embodiment of the present invention.

Yet another family of inventive micronozzle designs is referred to herein as plug annular micronozzles (PAM), as shown in FIGS. 9, 11, and 13. Referring first to FIG. 11, the microthruster 220 is shown having a center body 232 as part of the center electrode 226. It is understood that although the various center bodies shown herein are extensions of an inner electrode, the present invention is not so limited. Other embodiments of the present invention contemplate center bodies placed within flow fields of microthrusters utilizing other means for adding energy to the propellant, and also for those microthrusters using cold gas.

Center body 232 includes a conical forward portion 234 that is tapered outward toward the outer wall 256 of the conversion section. This first tapered portion breaks at a as it expands. This pocket of higher pressure may not necessarily form directly against the centerbody.

If so, the pressure will decrease a bit before the pocket can push against the aft face of the centerbody. This is because the flow expands and fails to turn fast enough to stay up against the centerbody.

Figure 9A:
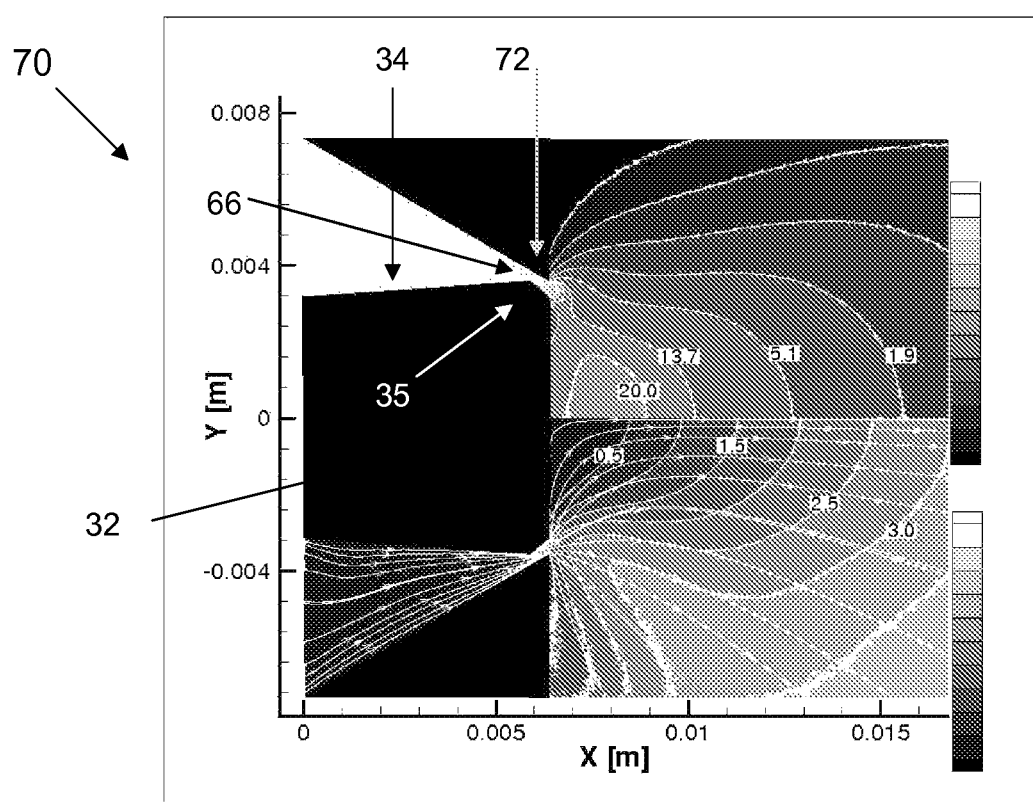
FIG. 9 show graphical representations of the analytical predictions for micronozzle performance for plug-annular micronozzles having conically tapered centerbodies, with the DSMC calculated pressure contours, mach number contours, and streamlines having the same scaling as for FIG. 8.
Figure 9B:
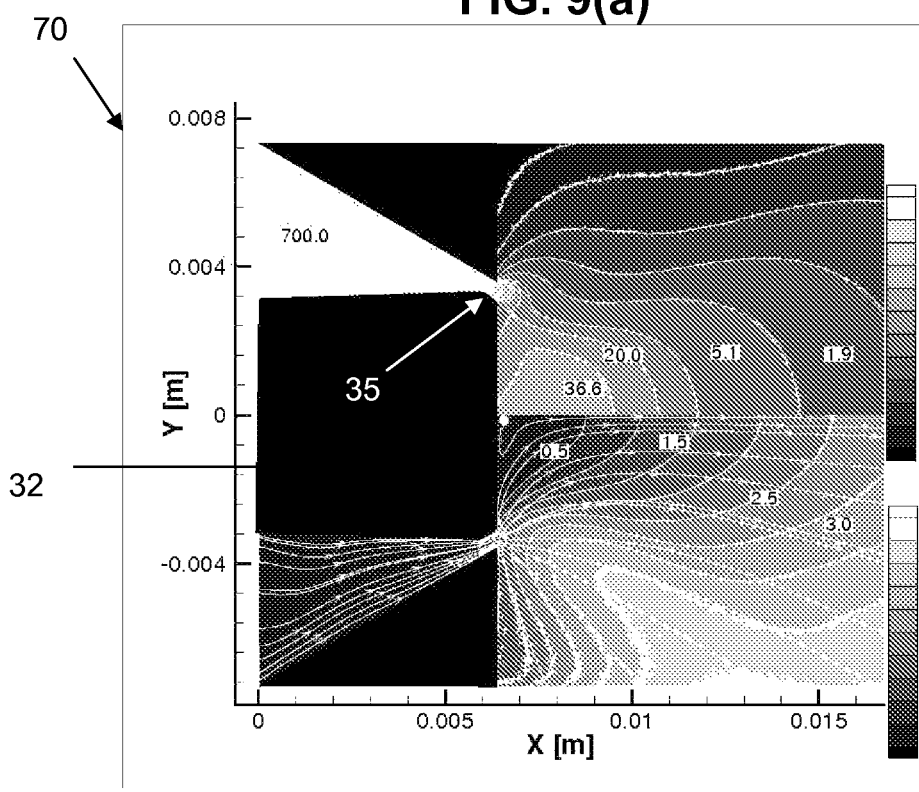

Referring again to FIGS. 9(a) and 9(b), the region upstream of the throat was also varied to investigate improving nozzle performance. Three geometries were selected using deflections upstream of the throat which angle the flow towards the centerbody. The first geometry, PAM 1 provides a constriction upstream of the throat. The geometry PAM 2 as shown in FIG. 9(a) provides a deflection upstream of the throat, with the throat remaining the minimum area. The center body outer diameter (i.e., the inner wall of the propellant flow path) expands conically in the direction of propellant flow at an angle of about four degrees. With regards to FIG. 9(b), likewise that center body is tapered and conically increasing in diameter in the direction of propellant flow. The angle of the outer surface of the center body in FIG. 9(b) is about two degrees. Therefore, in the converging sections shown in FIGS. 9(a) and 9(b) the walls of the propellant flow-path are both non-parallel relative to the center line of the thruster.

Figure 10:
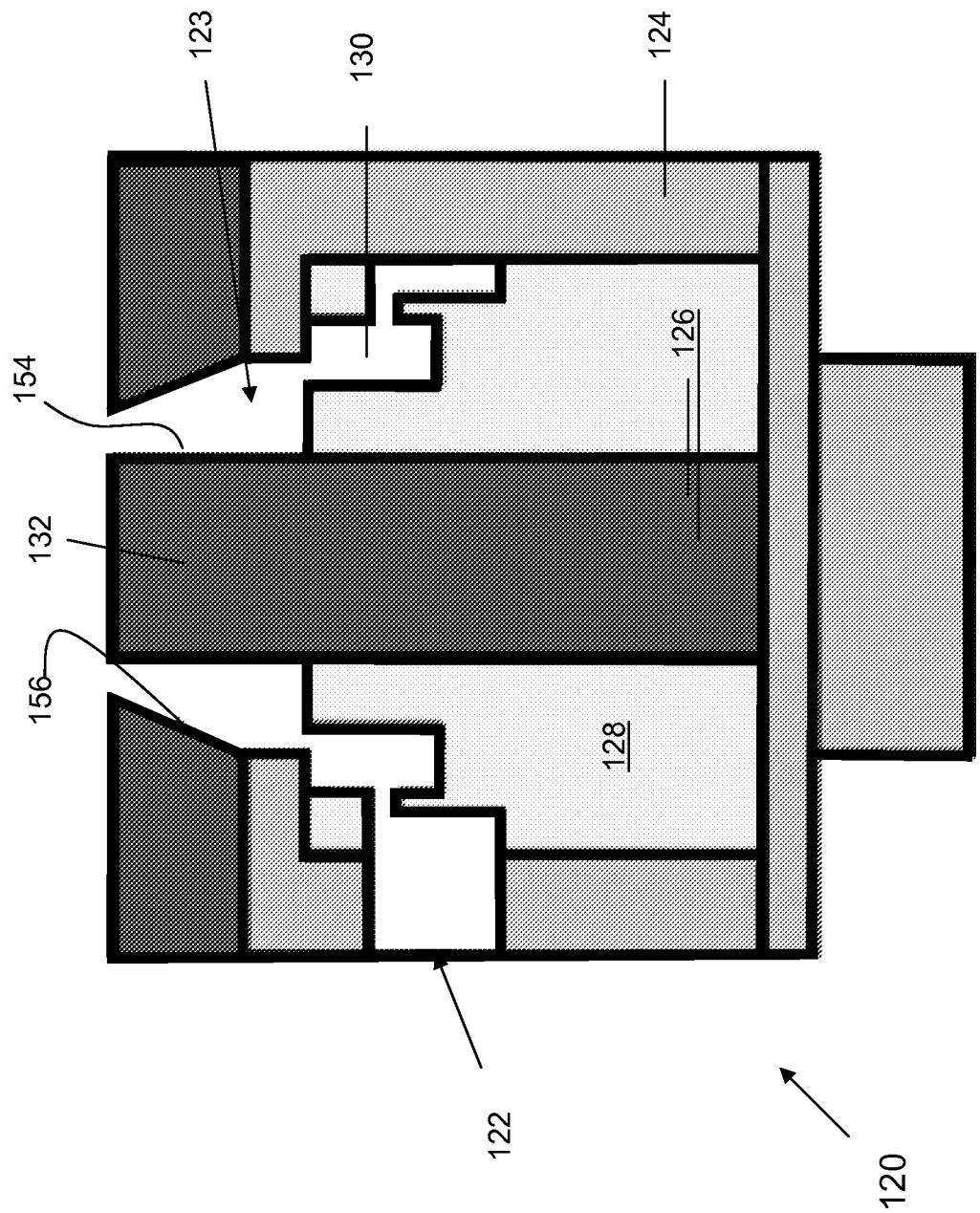
FIG. 10 is a cross sectional schematic representation of a microthruster according to one embodiment of the present invention.
Figure 12:
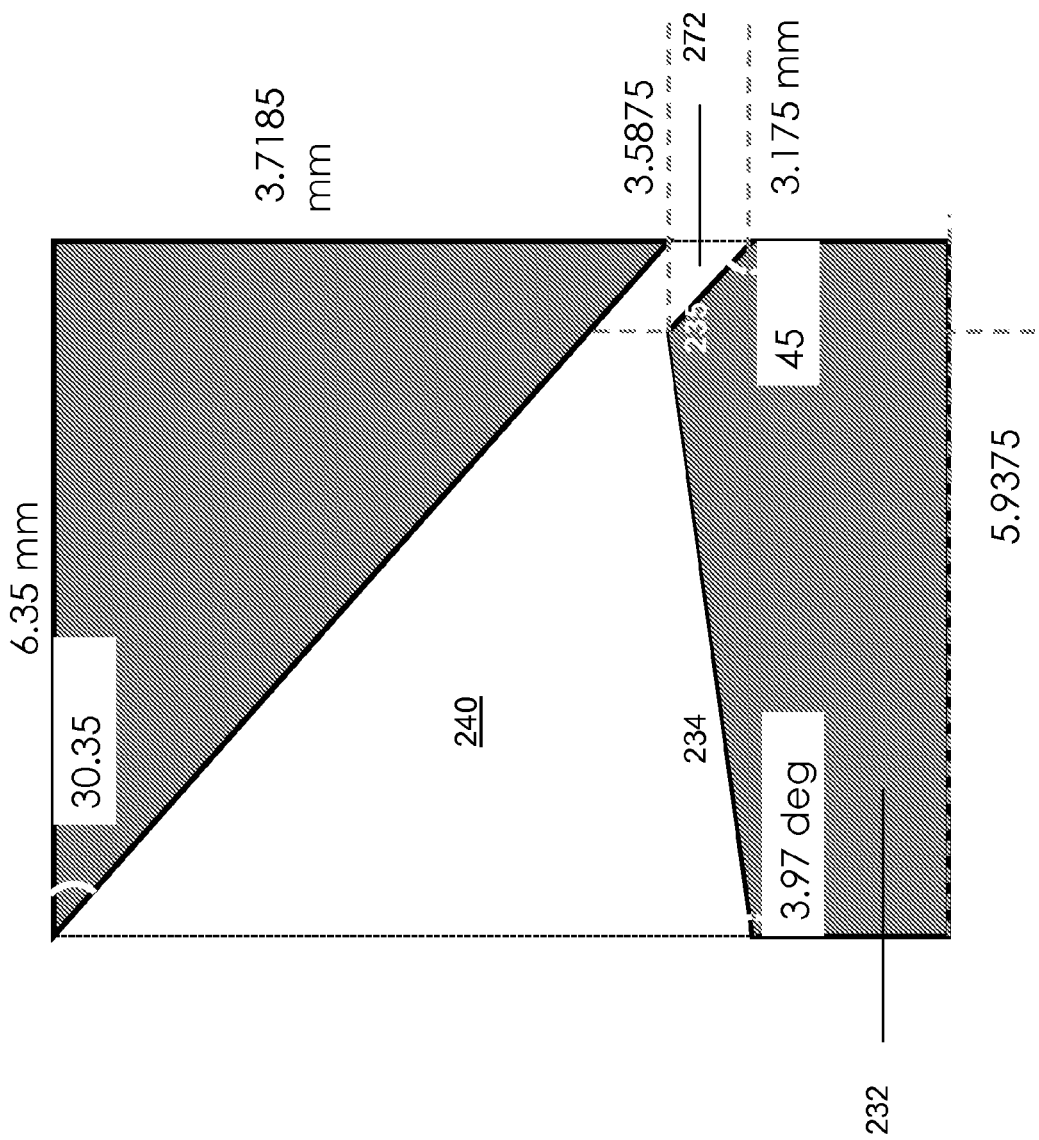
FIG. 12 is a dimensioned, schematic representation of a portion of the apparatus of FIG. 11.

In various embodiments of the present invention, the aft-diverging conical shape of the center body is angled anywhere from about one degree to about six degrees. The deflection in PAM 3 is parallel to the converging section of the nozzle wall. These geometries and their results are shown in FIGS. 10, 12, and 13 and are listed in Table 6 in order of increasing deflection. The PAM 1 $f$ geometry is a modification of the PAM 1 geometry, using a horizontal surface inside the convergent section of the nozzle instead of a ramp. A schematic representation of the geometry of the PAM 2 configuration (which is also the modeled geometry shown in FIG. 9(a). FIG. 12 shows the center body 232 having a conical, outwardly tapering portion 34 followed by a conical, inwardly tapering section 235.

TABLE 6

Micronozzle Performance for Plug-Annular Micronozzles

| Case | Re | $\dot{m}$ [mg/s] | F [mN] | $F_{jet}$ [%] | $F_{jp}$ [%] | $F_{np}$ [%] | $F_{cb}$ [%] | $I_{sp}$ [s] | Improv. over Baseline [%] |
|---|---|---|---|---|---|---|---|---|---|
| Baseline | 72.1 | 0.959 | 0.435 | 53.8 | 45.1 | 0.95 | — | 46.2 | — |
| Annular Nozzle | 29.2 | 0.825 | 0.874 | 25.9 | 15.2 | 3.09 | 56.2 | 108 | 134 |
| PAM 2 | 39.7 | 0.676 | 0.805 | 24.3 | 11.9 | 1.22 | 62.5 | 121 | 262 |
| PAM 3 | 37.2 | 0.642 | 0.778 | 24.1 | 11.5 | 1.06 | 63.4 | 124 | 268 |
| PAM 1 | 20.8 | 0.380 | 0.464 | 23.4 | 10.6 | 0.75 | 65.3 | 125 | 270 |
| PAM 1F | 23.7 | 0.430 | 0.533 | 23.8 | 10.6 | 0.88 | 64.7 | 125 | 270 |

The results from these nozzles show that decreasing the flow area upstream of the throat increases performance. Constricting the upstream area chokes the flow upstream of the previous throat, essentially creating a smaller converging-diverging section of the nozzle inside the nozzle. This section is also aimed at the center-body and thus, accelerates the flow toward the centerline more than the previous geometries. This effect increases the pressure thrust on the center-body due to the larger radial component of the velocity which impinges aft of the center-body and increases the pressure. Table 6 illustrates this point by showing that as the internal deflection angle increases, the $I_{sp}$ also increases. Also, the geometry upstream of the choke point has less influence on the nozzle performance. This can be shown by comparing the PAM 1 and PAM 1F cases in Table 6.

The various embodiments shown herein of coaxial micronozzle center-body geometries can potentially provide thrust in the milli-Newton range while achieving improvements in specific impulse compared to typical converging nozzle cold gas thrusters. Changes in throat diameter, the geometry of the converging section and the addition of a diverging section provide some improvement over a comparable converging nozzle at these operating conditions. The addition of blunt center-bodies and deflections upstream of the throat increase the pressure thrust due to the creation of a recirculation/stagnation zone aft of the center-body. This increase in pressure thrust is of the same magnitude as the jet thrust, thus increasing the thrust level for the same mass flow rate. Short center-bodies perform better than longer center-bodies due to a reduction in viscous losses and better capture of the flow expansion. This performance improvement is generally applicable at low Reynold's numbers, low thrust, and vacuum conditions. However, various embodiments of the present invention are not so limited, and further, various embodiments of the present invention shown herein are applicable to cold gas flow and also to gas flow whose energy has been increased by a power source including combustion of a substance.

| Case | Re | $\dot{m}$ [mg/s] | F [mN] | $I_{sp}$ [s] |
|---|---|---|---|---|
| PAM | 0.12 | 0.0021 | 0.00036 | 36.3 |
|  | 1.29 | 0.02 | 0.01 | 51.8 |
|  | 8.59 | 0.16 | 0.15 | 96.9 |
|  | 14.4 | 0.26 | 0.29 | 114 |
|  | 20.8 | 0.38 | 0.47 | 125 |
|  | 34.7 | 0.63 | 0.86 | 139 |
|  | 47.3 | 0.86 | 1.2 | 146 |
| Conical Nozzle | 22.8 | 0.37 | 0.34 | 95.0 |
|  | 36.3 | 0.59 | 0.61 | 105 |
|  | 50.9 | 0.82 | 0.89 | 110 |

A microthruster 20 for a spacecraft according to a different embodiment of the present invention includes these features:

The microthruster includes a supply of pressurized gas.

The microthruster includes a pressure vessel (referring to FIG. 1, formed between the outer electrode, the inner electrode, and the dielectric, but in the general case the pressure vessel is an outer member that defines a pressurized volume) having an entrance (22) for receiving the supply of gas and defining an exit (58) for releasing the gas to ambient conditions (which in some embodiments is an absolute pressure less than about two Torr), the pressure vessel defining an internal flowpath between the entrance and exit.

The microthruster includes a generally cylindrical centerbody (such as dielectric 26 shown in FIG. 2, but in the general case can be any object within the pressurized volume, and which has an outer surface that is also an inner wall of the flowpath) extending through at least a portion of the flowpath (it not being required that the centerbody extend along the entire flowpath, and generally is located proximate to the exit, but which can extend throughout most or all of the internal flowpath) and extending into the exit so as to form a generally annular throat.

The microthruster is adapted and configured such that the Reynolds number through the throat is less than about one thousand.

A microthruster 20 for a spacecraft according to a different embodiment of the present invention includes these features:

The microthruster includes a supply of pressurized gas.

The microthruster includes a pressure vessel having an entrance for receiving the supply of gas and defining an exit for releasing the gas to ambient conditions, the pressure vessel defining an internal flowpath between the entrance and exit.

The microthruster includes a centerbody having a first section extending through at least a portion of the flowpath (as best seen in FIGS. 9(a), 9(b), 11, and 12; and in FIGS. 9(a) and 9(b) extending to a position X of about 0.006), the first section having a conical outer surface such that the centerbody diameter increases in the direction of flow toward the exit (this slope being about one to six degrees), said centerbody having a second section extending from the first section to the exit (referring to FIGS. 9(a) and 9(b) from a position X of about 0.0006 to about 0.00063); the second section having a conical outer surface such that the centerbody diameter decreases in the direction of flow toward the exit, the second section and the exit forming an annulus therebetween. The centerbody includes an aft face proximate to the annulus and the aft face is blunt.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A microthruster for a spacecraft, comprising:
a supply of pressurized gas;
a pressure vessel of the microthruster having an entrance for receiving the supply of gas and defining an exit for releasing the gas to ambient conditions, the pressure vessel defining an internal flowpath between the entrance and exit, and
a generally cylindrical centerbody having an aft face extending through at least a portion of the flowpath and extending into the exit so as to form a generally annular throat, the generally cylindrical centerbody defining a central axis extending along the length of the generally cylindrical centerbody, the aft face of the generally cylindrical centerbody is coplanar with the exterior portion of the nozzle adjacent to and surrounding the exit;
wherein the Reynolds number (Re) through the throat is less than about one thousand when the gas is released from the pressure vessel and travels through the throat to the exit, wherein the Reynolds number (Re) is $$Re = \frac{m n_{ng} V_s D_{th}}{u_{ref}},$$

m being the neutral particle mass of the gas, $n_{ng}$ being the neutral gas number density of the gas, $V_x$ being the velocity component of the gas parallel to the central axis, $D_{th}$ being the throat diameter, and $u_{ref}$ being reference viscosity of the gas at 300K.

2. The microthruster of claim 1 wherein the Reynolds number is less than about one hundred.

3. The microthruster of claim 1 wherein the ambient pressure condition is a vacuum.

4. The microthruster of claim 1 wherein the aft face of the centerbody is blunt.

5. The microthruster of claim 4 wherein the aft face of the centerbody is flat.

6. The microthruster of claim 4 wherein the flowpath of the pressure vessel converges proximate to the exit and some of the exiting gas impinges on the aft face.

7. The microthruster of claim 4 wherein the blunt face is rounded.

8. The microthruster of claim 4, wherein the flowpath defined by the microthruster at the exit is directed inward toward the central axis to impinge on itself.

9. The microthruster of claim 4, wherein the flowpath defined by the microthruster at the exit creates a high pressure region aft of the exit.

10. The microthruster of claim 1 wherein the aft face of the centerbody is generally conical.

11. The microthruster of claim 10 wherein the included angle of the cone is greater than about thirty degrees from the centerline of the centerbody to the aft edge of the centerbody.

12. The microthruster of claim 10 wherein the included angle of the cone is greater than about sixty degrees from the centerline of the centerbody to the aft edge of the centerbody.

13. The microthruster of claim 1 wherein said centerbody has an aft face proximate to the throat and the aft face of the centerbody is biconical.

14. The microthruster of claim 1 which further comprises means for adding energy to the pressurized gas.

15. The microthruster of claim 14 wherein the energy addition means is the electrostatic type.

16. The microthruster of claim 14 wherein the energy addition means is the electromagnetic type.

17. The microthruster of claim 14 wherein the energy addition means is the electrothermal type.

18. The microthruster of claim 14 wherein the energy addition means is the chemical type.

19. The microthruster of claim 1 wherein the walls of the annular throat are adapted and configured to direct some of the exiting gas toward the centerline of the throat.

20. The microthruster of claim 1 wherein the gas is a cold gas and the microthruster does not include means for adding energy to the pressurized gas.

21. The microthruster of claim 1 wherein said centerbody has an outer diameter and said centerbody includes a rounded edge joining the outer diameter to the aft face.

22. The microthruster of claim 1 wherein said centerbody has an outer diameter, and said centerbody includes a chamfered edge joining the outer diameter to the aft face.

23. The microthruster of claim 1 wherein the flowpath of the pressure vessel converges in the direction of flow of the gas toward the exit.

24. The microthruster of claim 1, wherein the flowpath defined by the microthruster at the exit creates a stagnation zone aft of the centerbody.

25. The micronozzle of claim 1, wherein the thrust produced by the micronozzle is approximately one (1) mN.

26. A microthruster for a spacecraft, comprising:
a supply of pressurized gas;
a pressure vessel of the microthruster having an entrance for receiving the supply of gas and defining an exit for releasing the gas to ambient conditions, the pressure vessel defining an internal flowpath between the entrance and exit, and
a centerbody having a first section extending through at least a portion of the flowpath, the first section having a conical outer surface such that the centerbody diameter increases in the direction of flow toward the exit, said centerbody having a second section extending from the first section to the exit; the second section having a conical outer surface such that the centerbody diameter decreases in the direction of flow toward the exit, the second section and the exit forming an annulus therebetween; wherein the centerbody includes an aft face is coplanar with the exterior portion of the nozzle adjacent to and surrounding the exit and the aft face is blunt.

27. The microthruster of claim 26 wherein the internal flowpath of the pressure vessel converges in the direction of flow of the gas toward the exit.

28. The microthruster of claim 27 wherein the walls of the internal flowpath facing the outer surface of the second section are generally parallel.

29. The microthruster of claim 27 wherein the walls of the internal flowpath facing the outer surface of the second section are generally divergent.

30. The microthruster of claim 27 wherein the centerbody and pressure vessel and adapted and configured such that the flow of pressurized gas is choked at the intersection of the first section and the second section.

31. The microthruster of claim 26 wherein the Reynolds number is less than about one hundred.

32. The microthruster of claim 26 wherein the ambient pressure condition is a vacuum.

33. The microthruster of claim 26 which further comprises means for adding energy to the pressurized gas.

34. The microthruster of claim 33 wherein the energy addition means is the electrostatic type.

35. The microthruster of claim 33 wherein the energy addition means is the electromagnetic type.

36. The microthruster of claim 33 wherein the energy addition means is the electrothermal type.

37. The microthruster of claim 33 wherein the energy addition means is the chemical type.

38. The microthruster of claim 26 wherein the annulus is conically converging in the direction of flow and directs some of the exiting gas toward the centerline of the throat.

39. The microthruster of claim 26 wherein the wherein the flowpath of the pressure vessel converges proximate to the exit and some of the exiting gas impinges on the aft face.

40. The microthruster of claim 26 wherein the blunt face is rounded.

41. The microthruster of claim 26 wherein the gas is a cold gas and the microthruster does not include means for adding energy to the pressurized gas.

42. The microthruster of claim 26, wherein the centerbody defines a central axis extending from the first section to the second section, and wherein the flowpath defined by the microthruster at the exit is directed inward toward the central axis to impinge on itself.

43. The microthruster of claim 26, wherein the flowpath defined by the microthruster at the exit creates a high pressure region aft of the exit.

44. The microthruster of claim 26, wherein the flowpath defined by the microthruster at the exit creates a stagnation zone aft of the centerbody.

45. The micronozzle of claim 26, wherein the thrust produced by the micronozzle is approximately one (1) mN.

46. A method for producing thrust with a microthruster in space, comprising:
    moving gas from a pressurized supply chamber of the microthruster, through an internal flowpath, to an exit, the internal flowpath being defined by a generally cylindrical cenerbody having an aft face extending into the exit and forming an annular throat, wherein the aft face of the generally cylindrical centerbody is coplanar with the exterior portion of the nozzle adjacent to and surrounding the exit; and
    releasing the gas from the exit to ambient conditions;
    wherein the Reynolds number through the throat during said moving and said releasing is less than about one thousand.

47. The method of claim 46, comprising:
    positioning the microthruster in space.

\* \* \* \* \*